United States Patent [19]
Endoh

[11] Patent Number: 6,137,614
[45] Date of Patent: Oct. 24, 2000

[54] OPTICAL SCANNER

[75] Inventor: Mitsuhiko Endoh, Iwatsuki, Japan

[73] Assignee: Fuji Xerox Co., Ltd., Tokyo, Japan

[21] Appl. No.: 09/453,823

[22] Filed: Dec. 3, 1999

[30] Foreign Application Priority Data

Dec. 18, 1998 [JP] Japan ................................ 10-360416

[51] Int. Cl.⁷ .................................................. G02B 26/08
[52] U.S. Cl. ......................... 359/196; 359/212; 359/216; 347/245; 347/263
[58] Field of Search .................................... 359/196–226; 347/256–261, 263, 233, 234, 242–245

[56] References Cited

U.S. PATENT DOCUMENTS 5,299,051  3/1994  Hirano ..................................... 359/216

FOREIGN PATENT DOCUMENTS 3-226709  10/1991  Japan .
4-127116   4/1992  Japan .
5-60991    3/1993  Japan .

*Primary Examiner*—James Phan
*Attorney, Agent, or Firm*—Oliff & Berridge, PLC

[57] ABSTRACT

An optical scanner can inhibit the quantity of thermal deformation and the variation of an optical path of an optical box attached to the frame of an image information device. In the scanner, a fixed part fixed to the frame of an image formation device is provided in a part of which the rigidity is relatively low apart from the corner in the vicinity of the vertex of the outside shape of the bottom of which the rigidity is relatively high in an optical box. Hereby, deformation of each part (in the vicinity of the corner and the side) by stress caused in the optical box due to a difference in the coefficient of linear expansion between the frame and the optical box as temperature in the image formation device varies can be uniformed, and warp like adrum that is apart to which an optical component is attached, that is, the bottom is tilted, which is the worst mode of deformation out of the variation of an optical path, can be reduced. Therefore, the variation of the inclination of the optical component held in the optical box based upon the optical axis is inhibited and the variation of the optical path is prevented.

7 Claims, 31 Drawing Sheets

DRAWING VIEWD FROM
DIRECTION SHOWN BY ARROW Z

OPTICAL SCANNER

BACKGROUND OF THE INVENTION

1. Field of the Invention

The present invention relates to an optical scanner used for an image recording device such as a laser printer and a digital copying machine for recording an image by exposing and scanning a scanned medium according to image information using a laser beam.

2. Description of the Related Art

Generally, an optical scanner is composed of a semiconductor laser beam source element that generates a light beam, a deflecting system, an optical component such as an imaging and scanning lens and a reflector and an optical box for housing them and is fixed to an image formation device by screws.

Generally, an optical box is fixed to an image formation device at three or four points as shown in FIGS. 22 and 23.

In FIGS. 22 and 23, a reference number 102 denotes an optical box and 104 denotes a fixed position.

If an optical box is fixed at four points as shown in FIG. 23, it is fixed in the vicinity of a vertex of its outside shape and if an optical box is fixed at three points as shown in FIG. 22, at least two points of them are also provided in the vicinity of a vertex of its outside shape.

For an optical scanner for an image formation device corresponding to a recent tendency to color, the one having plural light sources and plural scanning optical systems and housed in one optical box is disclosed in Japanese Published Unexamined Patent Application No. Hei 4-127116.

An optical box 106 of an optical scanner 105 shown in FIG. 24 is also fixed to a frame 108 of the body of a color image formation device at three points (a reference number 104 denotes a fixed position) and for the fixed position 104, two of the three points are provided in the vicinity of a vertex of the outside shape of the optical box as the above example of a conventional type.

In the optical scanner 105, to meet characteristic values such as a spot diameter on a photoconductor, the quantity of light and the position of a scanning line, the above optical component composing the optical scanner 105 is precisely mounted in the optical box 106, the attitude of a light source and an optical component is regulated and a laser beam optical path is composed and regulated so that the above optical path is ideal.

However, when the optical scanner 105 is mounted on the frame 108 of the color image formation device and an image formation process is operated, temperature around the optical scanner 105 differs from time when the optical scanner is assembled and regulated because of heat generated from a fixing device in the color image formation device and environment in which the color image formation device is installed.

At this time, when there is difference between the coefficient of linear expansion of the material of the frame 108 of the color image formation device and that of the material of the optical box 106, difference occurs in the quantity of expansion between the frame 108 and the optical box 106.

Particularly, the optical box of a recent optical scanner is generally made of resin to reduce the cost.

Therefore, as the optical box 106 made of resin is sufficiently larger than the frame 108 made of sheet metal in the coefficient of linear expansion in case the optical box 106 is made of resin and is fixed to the frame 108 made of sheet metal, large flexure is caused in the optical box 106 made of resin.

FIGS. 25A and 25B schematically show states before and after an optical box 112 made of resin is transformed when temperature in the following image formation device rises in case the optical box 112 made of resin is fixed to the body frame 114 of the image formation device made of metal by screws 116.

When temperature in the image formation device varies, the bottom of the optical box 112 made of resin is warped like a drum as shown in FIG. 25B, as a result, a part in which a rotary polygon mirror 118, an fO lens group 120 and a plane mirror 122 are mounted is displaced, an ideal optical path L is deflected to be an optical path L', characteristic values on a photoconductor produced by an optical scanner cannot be met, in addition, a light beam does not reach the photoconductor and a terrible failure of the quality of an image such as a void may be caused.

Particularly, when the part in which a reflector such as the rotary polygon mirror 118 and the plane mirror 122 is mounted is tilted because of deformation off an ideal state, the optical path is largely influenced. As described above, such a warp in a direction shown by an arrow Z of the bottom of the optical box 112 as the part in which an optical component is mounted is tilted has a large effect upon the variation of the optical path.

As the deformation by a change of temperature of the optical box is caused because of difference in the coefficient of linear expansion, the material of the optical box and the image formation device frame fixing the optical box, the number of points at which the optical box is fixed to the image formation device frame and a fixed position have an effect.

FIGS. 26 to 28 show results that the shape of an optical box in a conventional type of a general optical scanner is modeled to be a simple model and deformation by heat is simulated using a finite element method.

FIG. 26 shows the shape of a simple model. It is premised that an optical box 102 is made of polycarbonate resin and the optical box 102 is fixed to the body frame made of iron of the image formation device not shown by screws, and is performed simulation when temperature in the image formation device rises up to 35° C. in a state in which fixed positions 104 (shown in black circles) are provided in the vicinity of a vertex of the outside shape of the optical box in case the optical box is fixed at four points as in the conventional type and in a state in which two fixed positions are provided in the vicinity of a vertex of the outside shape of the optical box in case the optical box is fixed at three points.

FIGS. 27 and 28 shows the result of simulation respectively showing the deformed states of the optical box in case it is respectively fixed at three points and at four points. Each drawing shows deformation in a direction of the y-axis (shown by an arrow Y) which has a large effect particularly upon the variation of an optical path as described above.

As clear from FIGS. 27 and 28, the bottom of the optical box is warped like a drum between points fixed by a screw (the fixed positions 104).

Next, the shape of an optical box for an optical scanner used for a color image formation device is modeled to be a simple model and the simulation of deformation due to heat is performed.

The optical box for the optical scanner for the color image formation device is generally made of metal in view of size, precision and strength.

Therefore, simulation when temperature in the image formation device rises up to 35° C. in case the optical box is made of aluminum, the body frame of the image formation device is made of iron and the optical box is fixed at three points as in the conventional type is performed.

FIG. 29 shows the shape of a simple model of an optical box 106, and FIGS. 30 and 31 show the result of simulation respectively showing a deformed state.

As shown in FIG. 31, the bottom of the optical box 106 is warped like a drum between points fixed by a screw (fixed positions 104) as the result of a general optical scanner.

A mode of deformation differs between right and left parts in case the above bottom is divided based upon a central line C—C of the optical box 106.

In the optical scanner of the color image formation device, a positional characteristic of each light beam is very important in addition to characteristic values when a general single light beam scans a photoconductor.

In the color image formation device, a light beam corresponding to each color from the optical scanner is irradiated and scans on each photoconductor 130K, 130Y, 130M, 130C corresponding to each color of yellow (Y), magenta (M), cyan (C) and black (BK) as shown in FIG. 32, an electrostatic latent image is formed and is developed by each developing device 132K, 132Y, 132M, 132C.

Afterward, transfer paper not shown on a transfer belt 134 is overlapped with the image, the image is transferred on the paper via an intermediate transfer roller and is fixed by a fixing device 138.

Therefore, if the deformation due to the change of temperature of an optical box 106 differs in the right and left parts in an optical scanner provided with an optical system corresponding to right and left each color with a rotary polygon mirror 139 in the center in one optical box 106 such as a conventional type optical scanner, the quantity of the variation of the optical path of each scanning line differs among each optical path, a scanning position (a relative position) of each light beam is displaced, as a result, color misregistration is caused and the quality of a color image is greatly influenced.

SUMMARY OF THE INVENTION

The present invention is made in consideration of the above fact and provides an optical scanner wherein the quantity of the deformation due to heat of an optical box caused by the change of temperature in an image formation device in the optical scanner is reduced and the variation of an optical path is reduced.

The optical scanner according to the present invention, used for an image formation device having an image carrier on which a light beam is irradiated and provided with an optical box fixed to the frame of the image formation device, has a light source that emits a light beam, a deflector that deflects the light beam, a lens system that performs scanning on the image carrier and forming an image thereon with the light beam deflected by the deflector, and an optical box that holds the light source, the deflector and the lens system, the optical box being provided with a polygonal bottom, walls stood on each side of the bottom and three or more fixed parts fixed to the frame. In the optical scanner, the fixed parts are provided in parts apart from the vertex of the outside shape of the bottom on the side of the bottom, and only one fixed part is provided on one side.

As the optical box is provided with its polygonal bottom and walls stood on each side of the bottom, the rigidity in the vicinity of the vertex of the outside shape of the bottom is higher than that of other parts.

Therefore, the optical box is fixed in a part having relatively low rigidity separated from the corner having relatively high rigidity in the optical box out of the sides of the bottom in the vicinity of the vertex of the outside shape of the bottom, if the optical box is fixed to the frame in the above part, the deformation of each part (the periphery of the corner and the side) due to stress generated in the optical box because of difference in the coefficient of linear expansion between the frame and the optical box as temperature in the image formation device provided with the optical scanner varies can be uniformed, and warp like a drum that is a part to which an optical component (the light source, the deflecting system and the lens system) is attached, that is, the bottom is tilted, which is the worst deformation mode in the variation of an optical path, can be reduced.

Therefore, variation of the inclination of the optical component held in the optical box for an optical axis is reduced and the variation of an optical path can be prevented.

According to another aspect of the present invention, the optical scanner, used for an image formation device provided with plural image carriers on which a light beam is irradiated, has an optical box fixed to the frame of the image formation device, a light source housed in the optical box for emitting a light beam, a deflector provided with a single rotary polygon mirror for deflecting the light beam, and a horizontal scanning lens for scanning the image carriers with the light beam deflected by the deflector in a horizontal scanning direction. In the optical scanner, the image carriers are scanned with the reflected light beam via the horizontal scanning lens arranged on both sides of the rotary polygon mirror by making plural light beams incident on each of different symmetrical surfaces of the rotary polygon mirror and reflecting the light beam incident on one surface and the light beam incident on the other surface in reverse directions. The optical box is provided with a polygonal bottom for holding at least the rotary polygon mirror and the horizontal scanning lens and walls stood on each side of the bottom and is provided with at least four fixed parts fixed to the frame, the fixed parts are provided in parts apart from the vertex of the outside shape of the bottom on the side of the bottom, only one fixed part is provided on the one side, and the plural fixed parts are provided substantially in a position of point symmetry based upon the center of the turning of the rotary polygon mirror, at least one line connecting symmetrical two fixed parts based upon the center of the turning out of at least four or more fixed parts is substantially parallel to the optical axis of the horizontal scanning lens and at least one line connecting the other residual two fixed parts is substantially parallel to a horizontal scanning direction.

In the optical scanner, a symmetrical optical system that an optical system on one side and an optical system on the other side based upon the rotary polygon mirror are symmetrical is constituted.

As in the above symmetrical optical system, at least one line connecting symmetrical two fixed parts based upon the center of the turning of the rotary polygon mirror is substantially parallel to the optical axis of the horizontal scanning lens and at least one line connecting the other residual two fixed parts is substantially parallel in the horizontal scanning direction, a part on each line connecting the above fixed points of the optical box is deformed symmetrically based upon each line even if small deformation is caused due to the variation of temperature. Hereby, as the position and the attitude of an optical component held in the optical box such as the light source and the horizontal scanning lens vary approximately symmetrically based upon the above each line, no difference in a vertical scanning direction is made at both scanning ends of a light beam even if a light beam is a little deflected in the vertical scanning direction and no skew of a scanning line is caused.

The quantity of the variation of each scanning line drawn by light beams incident on the different symmetrical surfaces of the rotary polygon mirror and deflected is also equal and the positional control of a scanning line is simplified.

According to another aspect of the present invention, the optical scanner may further have plural light receiving elements provided corresponding to each of plural light beams for detecting a light beam and a single reflector for guiding plural light beams to the above plural light receiving elements are provided and the above reflector is fixed in the vicinity of the above fixed part.

In the optical scanner, as a reflector for guiding each light beam to the light receiving element is provided not for every light beam but for only one, it is not required to provide a reflector for every light beam and provide fixed parts of plural reflectors, and dispersion due to relative difference among the reflected light of each light beam caused by the dispersion of the precision of the fixed part of each reflector can be prevented.

As the optical box is provided in a part where there is little deformation of the optical box by the variation of temperature, the variation of an optical path from the reflector to the light receiving element is not substantially caused by fixing the reflector in the vicinity of the fixed part.

Therefore, even if a scanning line on the image carrier in the image formation device is skewed due to the change of temperature, the variation of a light beam drawing a scanning line on the image carrier can be precisely detected owing to the light receiving element which is provided in the optical scanner and capable of detecting the variation of a light beam and the skew of the scanning line can be precisely corrected.

According to another aspect of the present invention, in the optical scanner, a control unit connected to a light receiving element and a light source is provided, the light receiving element for detecting a light beam reflected on one of the different symmetrical surfaces of a rotary polygon-mirror can detect the position in the horizontal scanning direction and the position in the vertical scanning direction of an incident light beam, the above control unit corrects the light beam emitting timing of a light source for emitting a light beam reflected on one surface of the rotary polygon mirror based upon the detection information of the position in the vertical scanning direction of a light beam by the light receiving element which can detect the position in the horizontal scanning direction and the position in the vertical scanning direction of a light beam, and the above control unit also corrects the light beam emitting timing of a light source for emitting a light beam reflected on the other surface of the rotary polygon mirror.

In the optical scanner, the light receiving element for detecting a light beam reflected on one of the different symmetrical surfaces of the rotary polygon mirror can detect the position in the horizontal scanning direction and the position in the vertical scanning direction of an incident light beam.

The above control unit corrects the light beam emitting timing of the light source for emitting a light beam reflected on one surface of the rotary polygon mirror and corrects the light beam emitting timing of the light source for emitting a light beam reflected on the other surface of the rotary polygon mirror respectively based upon the detection information of the position in the vertical scanning direction of a light beam by the light receiving element which can detect the position in the horizontal scanning direction and the position in the vertical scanning direction of a light beam.

In the optical scanners, as the quantity of the variation of optical paths due to the change of the temperature of light beams incident on the different symmetrical surfaces of the rotary polygon mirror and deflected for scanning is equal between the light beams, the position in the vertical scanning direction of the light beam reflected on the other surface of the different symmetrical surfaces of the rotary polygon mirror can be corrected together with the position in the vertical scanning direction of a light beam incident on the light receiving element which can detect the position in the horizontal scanning direction and the position in the vertical scanning position based upon the detection information of the position in the vertical scanning direction detected by the light receiving element which can detect the position in the horizontal scanning direction and the position in the vertical scanning direction of the light beam reflected on one of the different symmetrical surfaces of the rotary polygon mirror.

Therefore, the detection of the position in the vertical scanning direction of all light beams is not required and even if a scanning line on the image carrier is deflected in the vertical scanning direction due to the variation of temperature, the above variation can be corrected by a few number of light receiving elements and under simple control.

According to another aspect of the present invention, in the optical scanner, the above optical box is formed using a mold which is provided with plural gates for injecting material for forming the optical box and in which the plural gates are arranged substantially symmetrically based upon the optical axis of the above horizontal scanning lens and a line perpendicular to the optical axis of the horizontal scanning lens and passing the center of the turning of the rotary polygon mirror.

In the optical scanner, as the optical box is formed using a mold which is provided with plural gates for injecting material for forming the optical box and in which the plural gates are arranged substantially symmetrically based upon the optical axis of the horizontal scanning lens and a line perpendicular to the optical axis of the horizontal scanning lens and passing the center of the turning of the rotary polygon mirror, a mode of deformation and the quantity of deformation on one side and a mode of deformation and the quantity of deformation on the other side can be equalized based upon the optical axis of the horizontal scanning lens even if the optical box is made of material such as synthetic resin anisotropic in the coefficient of linear expansion (the fluid direction of resin and a direction perpendicular to the fluid direction differ in the coefficient of linear expansion), and a mode of deformation and the quantity of deformation on one side and those on the other side can be equalized based upon a line perpendicular to the optical axis of the horizontal scanning lens and passing the center of the turning of the rotary polygon mirror.

Therefore, if the optical box is made of resin, the correction can also be precisely performed.

According to another aspect of the present invention, in the optical scanner, the optical box may have an opening at a portion facing the bottom and a cover member for covering the opening, and a point at which the cover member is fixed to the optical box is provided in the vicinity of the vertex of each side of the outside shape on the side of the opening of the optical box.

In the optical scanner, as the cover member for covering the opening of the optical box is provided and the fixed points of the cover member to the optical box are provided in the vicinity of the vertex of each side of the outside shape on the side of the opening of the optical box, rigidity in the vicinity of the vertex of the optical box is enhanced and the cover member functions as the reinforcement of the optical box because the vicinity of the vertex of each side of the outside shape on the side of the opening of the optical box inhibits vibration in the inside and outside direction of the optical box.

Therefore, even if the rotational speed of the rotary polygon mirror is increased to correspond to high speed and high resolution, the variation of a scanning line due to the vibration of the optical box can be prevented.

BRIEF DESCRIPTION OF THE DRAWINGS

Preferred embodiments of an image scanner according to the present invention will be described in detail based on the drawings.

DESCRIPTION OF THE PREFERRED EMBODIMENTS

First Embodiment

Figure 1:
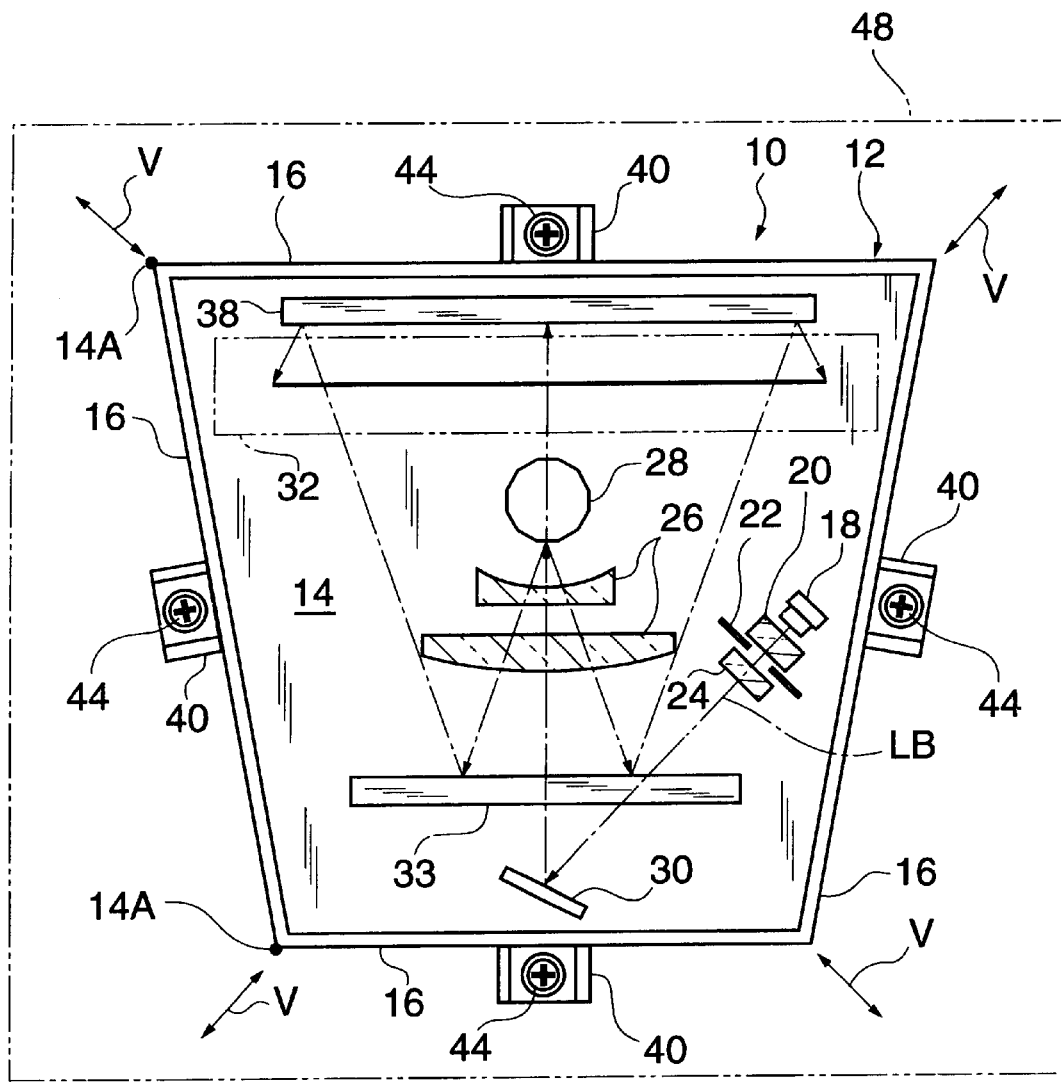
FIG. 1 is a plan showing an optical scanner equivalent to a first embodiment of the present invention.

Referring to the drawings, a first embodiment of an optical scanner according to the present invention will be described below.

Figure 2:
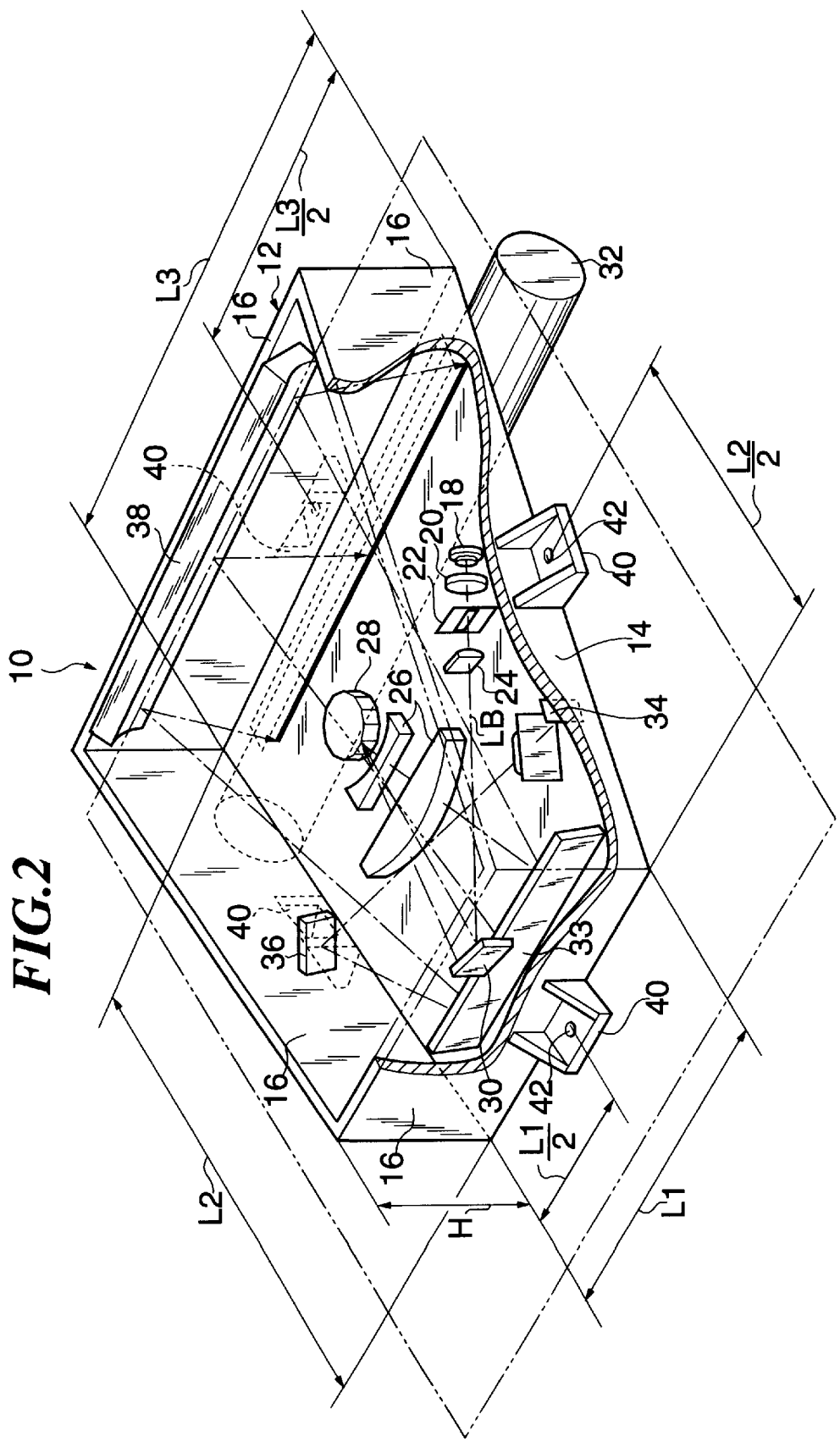
FIG. 2 is a perspective view showing the optical scanner equivalent to the first embodiment of the present invention.

As shown in FIG. 2, an optical scanner 10 equivalent to this embodiment is provided with an optical box 12 the upper part of which is open.

The optical box 12 is provided with a polygonal bottom, a trapezoidal bottom 14 in this embodiment and a side wall 16 is integrated on each side of the bottom 14.

A semiconductor laser 18, a collimator lens 20 for shaping a laser beam LB emitted from the semiconductor laser 18 and an aperture diaphragm 22 are housed in the optical box 12.

A cylindrical lens 24 is arranged next on the side from which the laser beam is outgoing of the aperture diaphragm 22 and the laser beam LB is converged only in a vertical scanning direction on the deflecting surface of a rotary polygon mirror 28 via an fθ lens group 26.

The laser beam LB passing the cylindrical lens 24 is reflected by a plane mirror 30 with a predetermined angle in a horizontal scanning direction and in the vertical scanning direction and is incident on the rotary polygon mirror 28 from its front via the fθ lens group 26 (incident from the center of a scanning range to the center of turning along the horizontal scanning direction).

The fθ lens group 26 focuses the laser beam LB reflected and deflected by the rotary polygon mirror 28 on a photoconductor 32 as an optical spot and moves the optical spot on the surface of the photoconductor 32 at equal speed.

As described above, in the optical scanner 10, a so-called front incident double path optical system that the laser beam LB incident and reflected on the rotary polygon mirror 28 passes the fθ lens group 26 twice is adopted.

The laser beam LB which is deflected by the rotary polygon mirror 28 and passes the fθ lens group 26 twice is reflected mainly in the vertical scanning direction by the long plane mirror 33 rectangular in the horizontal scanning direction.

A mirror 36 (not shown in FIG. 1) for guiding the laser beam LB to a sensor 34 (not shown in FIG. 1) for detecting the position of a scanning line in the horizontal scanning direction is arranged in the vicinity of the plane mirror 33.

The laser beam LB reflected by the plane mirror 33 is reflected by a cylindrical mirror 38 having power only in the vertical scanning direction and reaches the photoconductor 32.

The cylindrical mirror 38 is provided to correct misregistration in the vertical scanning direction caused due to the tilt of the reflecting surface of the rotary polygon mirror 28.

The semiconductor laser 18, the collimator lens 20, the aperture diaphragm 22, the cylindrical lens 24, the fθ lens group 26, the rotary polygon mirror 28, the plane mirror 30, the plane mirror 33, the sensor 34, the mirror 36 and the cylindrical mirror 38 are all attached to the bottom 14 of the optical box 12.

To meet the characteristics of a scanning line by an optical spot on the photoconductor 32 of the optical scanner 10, it is important that the optical path of the laser beam LB is regulated to be an ideal state and kept an ideal state.

Particularly, the attitude of the plane mirror 30, the rotary polygon mirror 28 and the long plane mirror 33 respectively on the upstream side of the optical path is important and if these reflectors are tilted particularly in the vertical scanning direction due to the deformation of each attached part caused by the deformation of the bottom 14 of the optical box 12, the optical path to the photoconductor 32 is off the ideal state.

As shown in FIGS. 1 and 2, a fixed part 40 is provided corresponding to the center of each side of the bottom 14 to the optical box 12.

A bolthole 42 is formed in the fixed part 40 and the optical box 12, that is, the optical scanner 10 is fixed to a frame 48 by screwing a bolt 44 through the bolthole 42 to a screw hole of the frame 48 of the image formation device.

For the size of the optical box 12 in this embodiment, L1 is set to 150 mm, L2 is set to 220 mm, L3 is set to 250 mm and the height H is set to 50 mm.

The optical box 12 in this embodiment is made of a polycarbonate resin (coefficient of linear expansion: $3.3 \times 10^{-5}$ mm/° C.) and the frame 48 of the image formation device is made of iron (coefficient of linear expansion: $1.17 \times 10^{-5}$ mm/° C.)

As for the change of temperature inside the image formation device, if heat generated from each component module such as a heating fixing device and a motor and the worst time of installation environment are considered, the rise of temperature up to approximately 35° C. for example than temperature in environment in which the optical scanner is assembled is required to be estimated around of the optical scanner 10.

Under the above condition, the deformation of the optical box 12 when temperature around the optical box 12 rises up to 35° C. is simulated using a finite element method.

Figure 3:
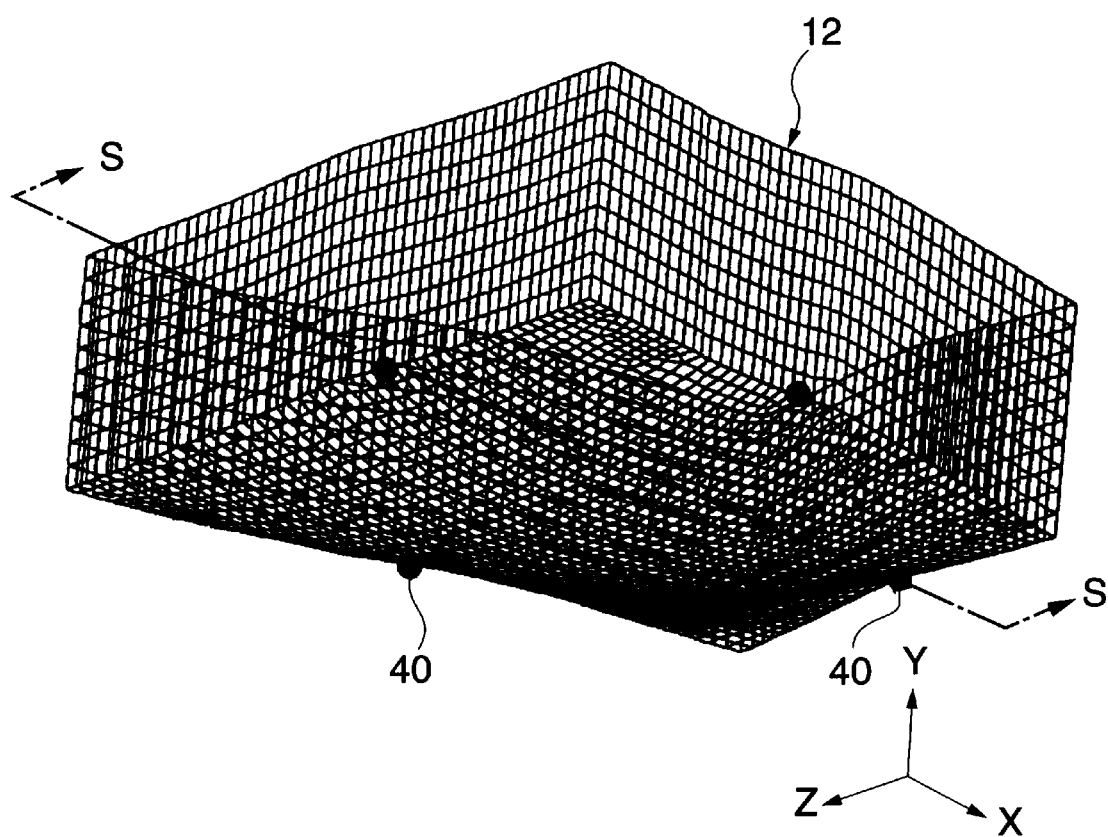
FIG. 3 is a perspective view showing the deformation of an optical box for the optical scanner equivalent to the first embodiment of the present invention.
Figure 4:
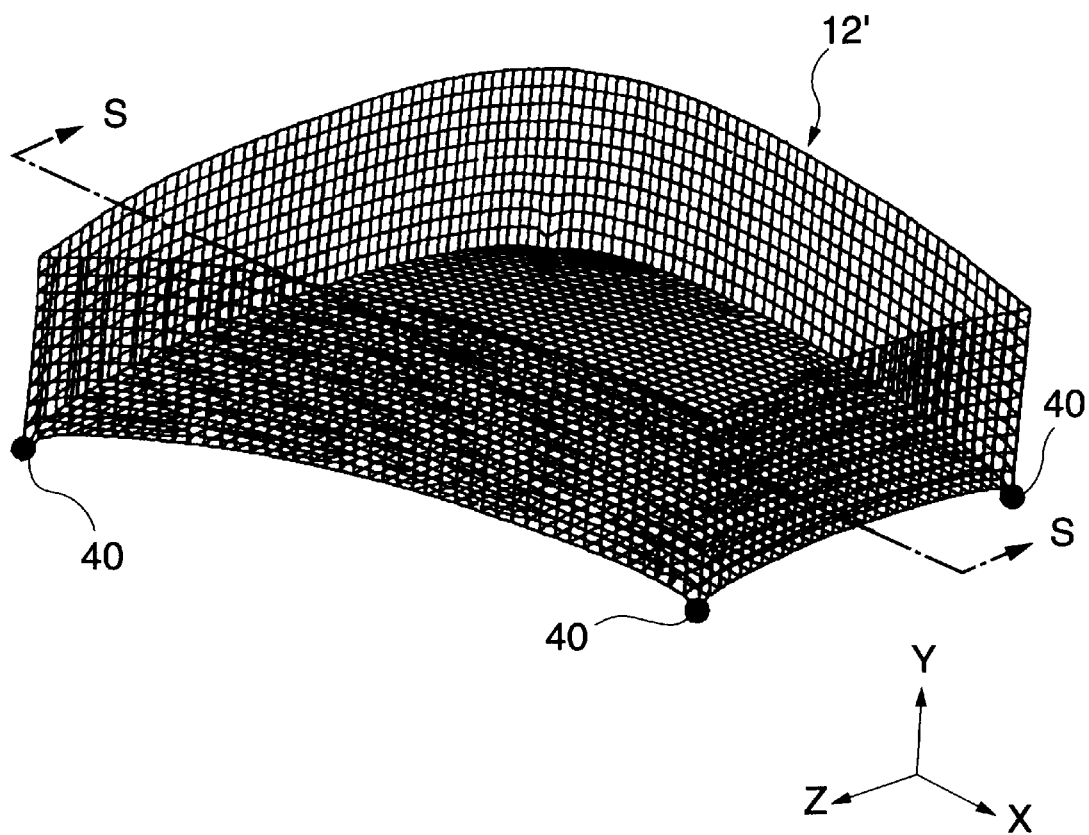
FIG. 4 is a perspective view showing deformation when a conventional type fixing method is applied to the optical box for the optical scanner equivalent to the first embodiment.

FIG. 3 shows a state of the deformation in a direction shown by an arrow Y of the whole optical box 12. FIG. 4 shows the result of the simulation of the deformation of an optical box 12' in the case where a conventional type fixing method (the optical box is fixed to the frame in the vicinity of the vertex of its outside shape) is applied under the above condition for a reference.

Figure 5:
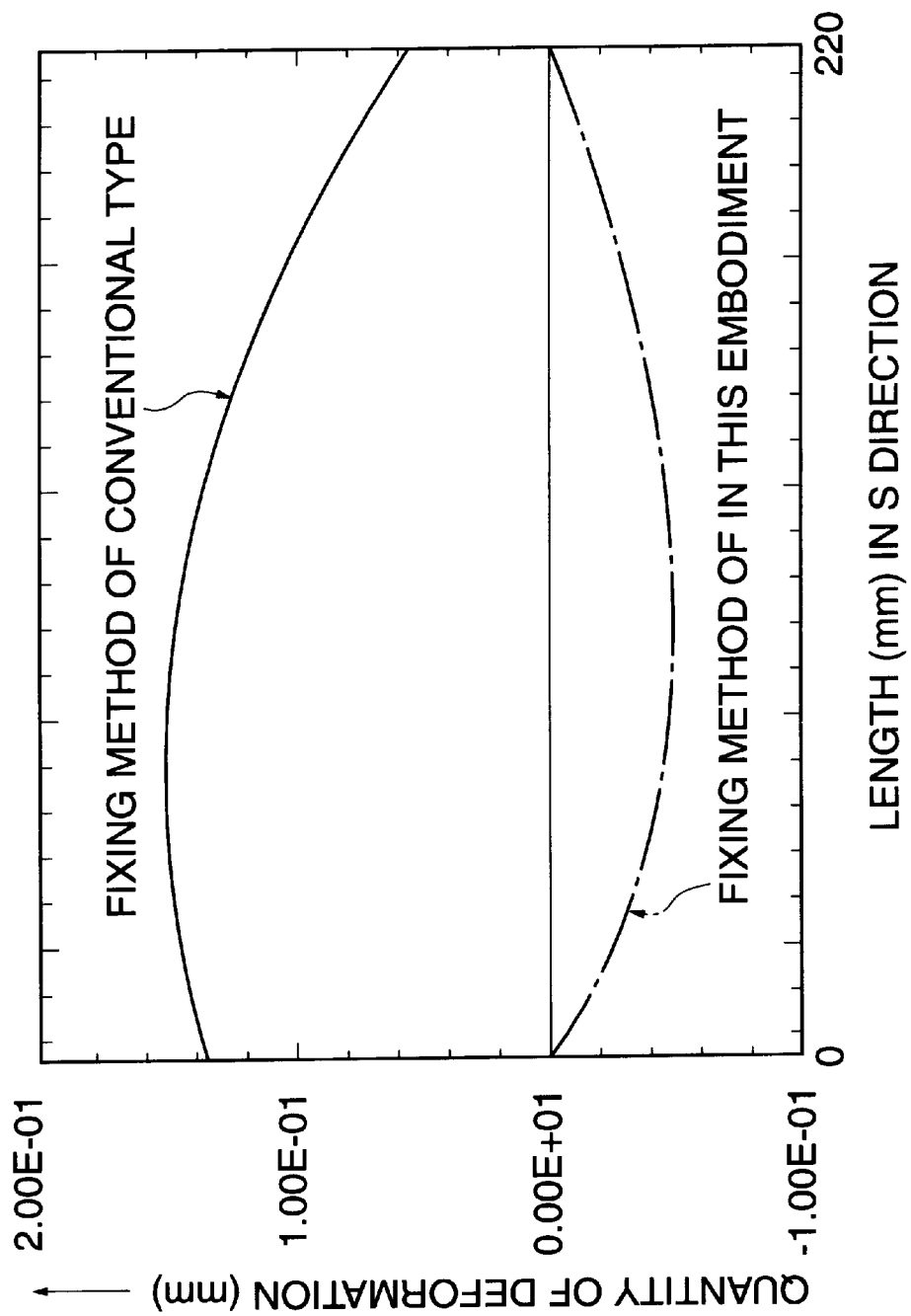
FIG. 5 is a graph showing the respective quantity of the deformation of the optical box shown in FIG. 3 and the optical box shown in FIG. 4.

FIG. 5 is a graph showing the quantity of deformation when deformed states shown in FIGS. 3 and 4 are viewed from a direction shown by an arrow S.

It is clear that as to the optical box 12 fixed according to this embodiment, the deformation of the bottom is smaller, compared with the deformation of the optical box 12' fixed according to the conventional type fixing method and there is no local deformation though overall extension occurs.

This reason is that as the optical box 12 is fixed to the frame 48 not in the vicinity of the vertex 14A of the bottom 14 the rigidity of which is relatively high of the optical box 12 but in a location the rigidity of which is relatively low and which is sufficiently apart from the vertex as described above (as a result, the location the rigidity of which is relatively low of the optical box 12 is fixed to the frame 48 and its rigidity is enhanced), the rigidity is uniformed as the whole optical box 12, therefore, deformation caused by stress generated due to the expansion or the reduction of the optical box 12 is also uniformed, the quantity of deformation is reduced as a whole and local deformation is also reduced.

The position of deformation on a cut surface S is approximately equal to the position (the optical axis of the fθ lens group 26) of a laser beam LB incident on the rotary polygon mirror 28 in the optical scanner 10 shown in FIG. 2, and the above position is close to positions in which the plane mirror 30, the rotary polygon mirror 28 and the long plane mirror 33 are attached.

If each variation of the attitude of each reflector according to the fixing method in this embodiment and according to the conventional type fixing method is calculated based upon these results and is converted to the variation of the optical path, the angle with the vertical scanning direction of the plane mirror 30 on the upstream side of the optical path is tilted by approximately 0.10, compared with an initial state and the optical path is deflected by 1 mm or more in a position immediately before the cylindrical mirror 38 only by the plane mirror 30 in the conventional type fixing method.

In the meantime, when the variation of the optical path is similarly calculated based upon the results in this embodiment, the quantity of the variation is approximately ½ of that in the conventional type fixing method and can be inhibited in a range of the quantity of the variation which can meet optical characteristics.

The simulated result of the variation of the optical path according to the fixing method in this embodiment shows approximately the similar value to a result actually measured by changing temperature in an actual model and it is verified that the characteristics of a light beam on the photoconductor 32 meet required values.

Figure 6:
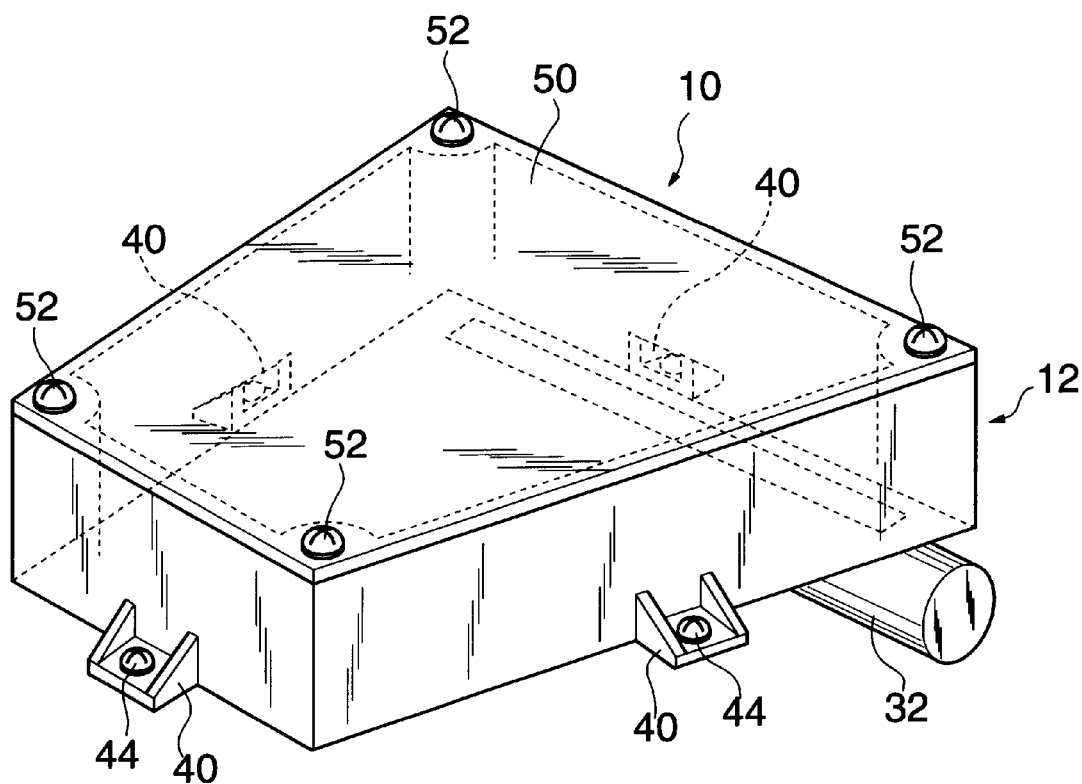
FIG. 6 is a perspective view showing appearance in which a cover member is provided to the optical box for the optical scanner equivalent to the first embodiment.

As shown in FIG. 6, a cover member 50 for covering an opening may also be attached on the open side of the optical box 12.

It is desirable that the cover member 50 is formed by material the rigidity of which is higher than the material of the optical box 12, for example metal the rigidity of which is high such as iron.

The cover member 50 is fixed in the vicinity of the vertex of each side of the outside shape of the optical box 12 by a screw 52.

When the optical box 12 is fixed as described above, a vibration mode in which the corner of the optical box 12 is vibrated in a direction shown by an arrow V shown in FIG. 1 occurs.

Characteristic values in the vibration mode hardly have an effect in the frequency of a rotary polygon mirror driving motor of a general optical scanner, however, the characteristic values may have an effect upon a motor corresponding to high speed and high resolution.

However, the cover member 50 functions as a reinforcement by fixing the cover member 50 to the optical box 12 as shown in FIG. 6, the rigidity of the whole optical scanner 10 can be enhanced and the above vibration mode can be prevented. Second Embodiment Referring to the drawings, a second embodiment of the optical scanner according to the present invention will be described below. The same reference number is allocated to the same component as the component in the first embodiment and the description is omitted.

Figure 9:
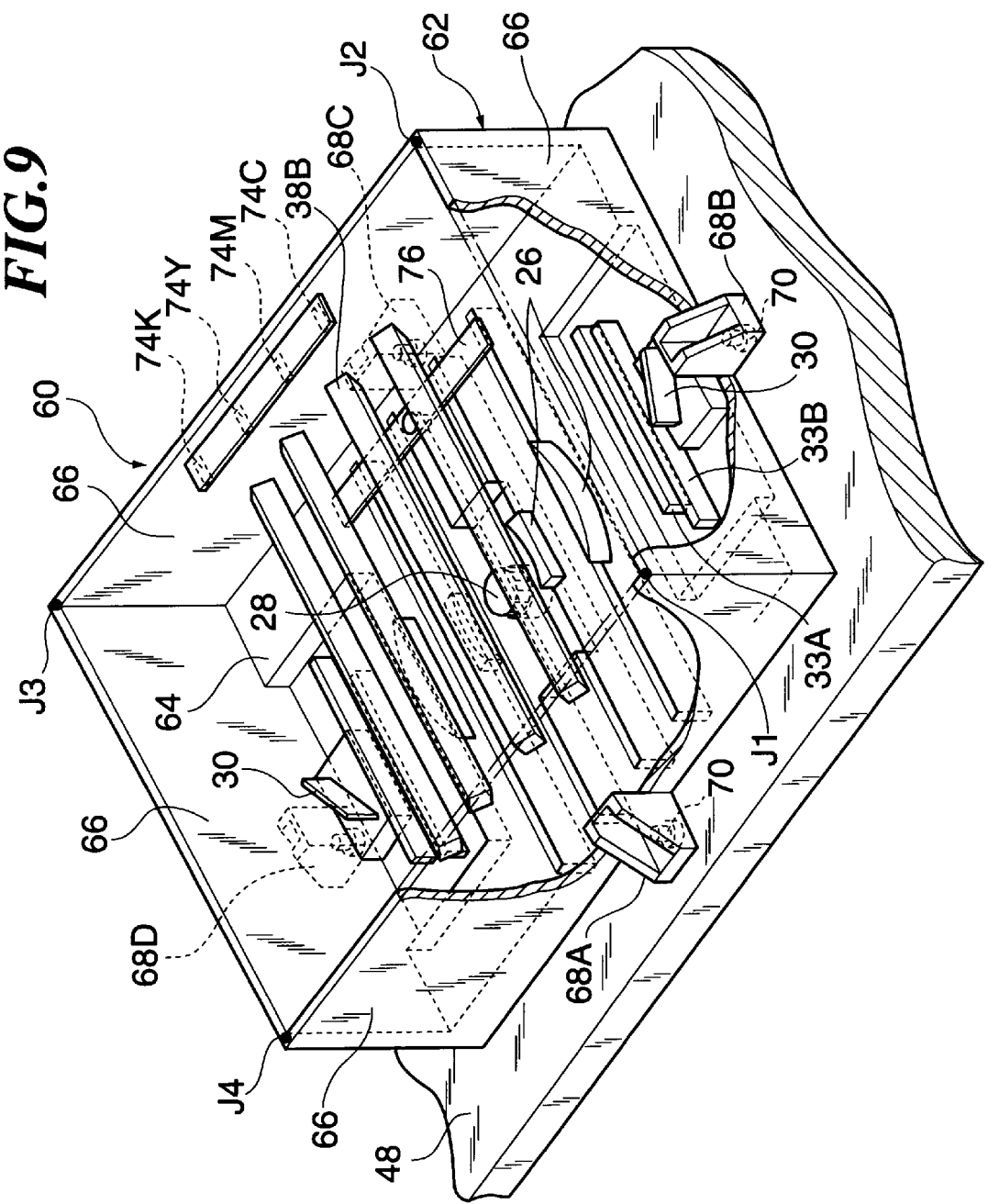
FIG. 9 is a perspective view showing the optical scanner equivalent to the second embodiment.

As shown in FIG. 9, an optical scanner 60 equivalent to this embodiment is provided with an optical box 62 the upper part of which is open.

The optical box 62 is provided with a rectangular bottom 64 and a side wall 66 is integrated on each side of the bottom 64.

Figure 7:
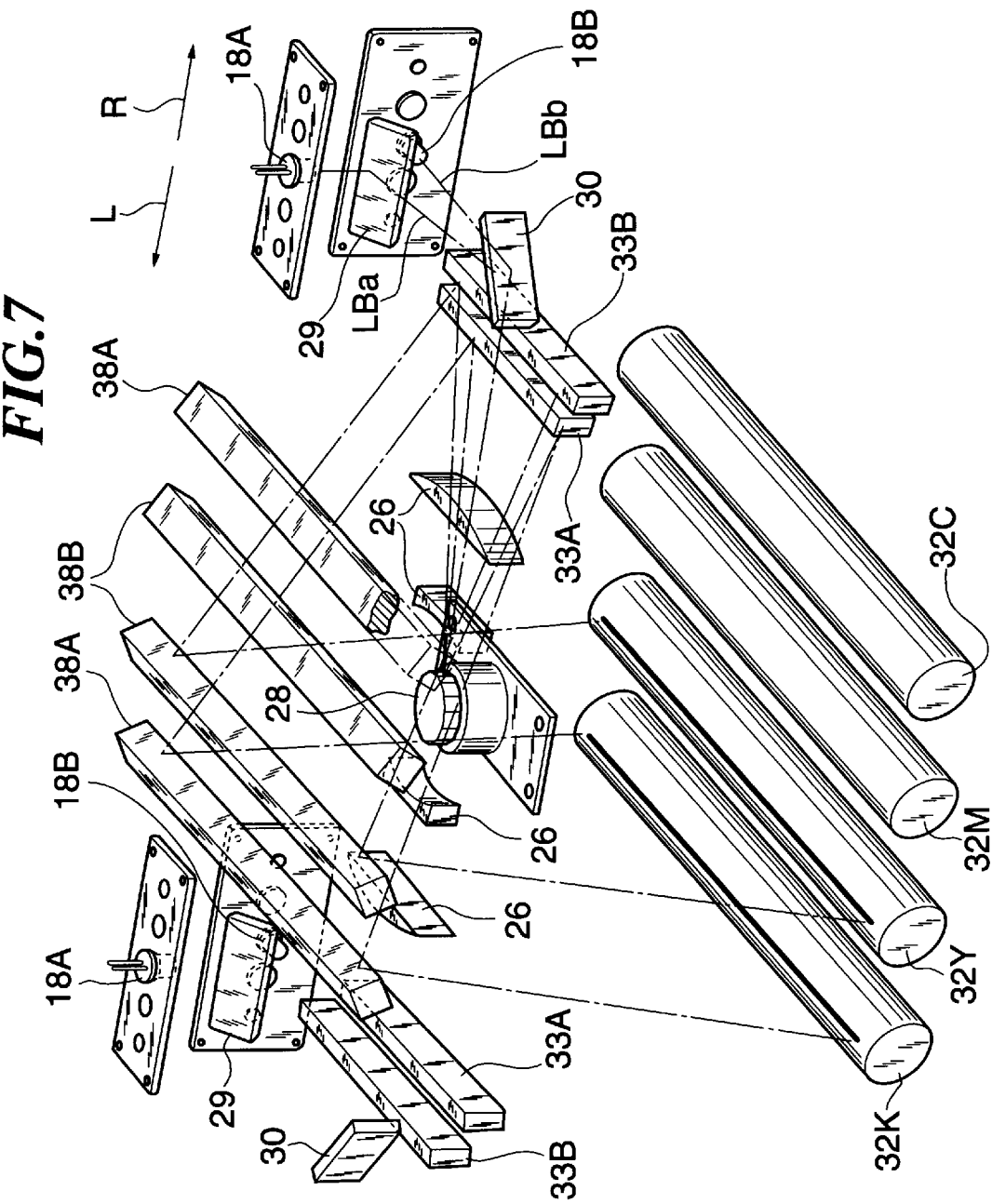
FIG. 7 is a perspective view showing an optical system in an optical scanner equivalent to a second embodiment.
Figure 8:
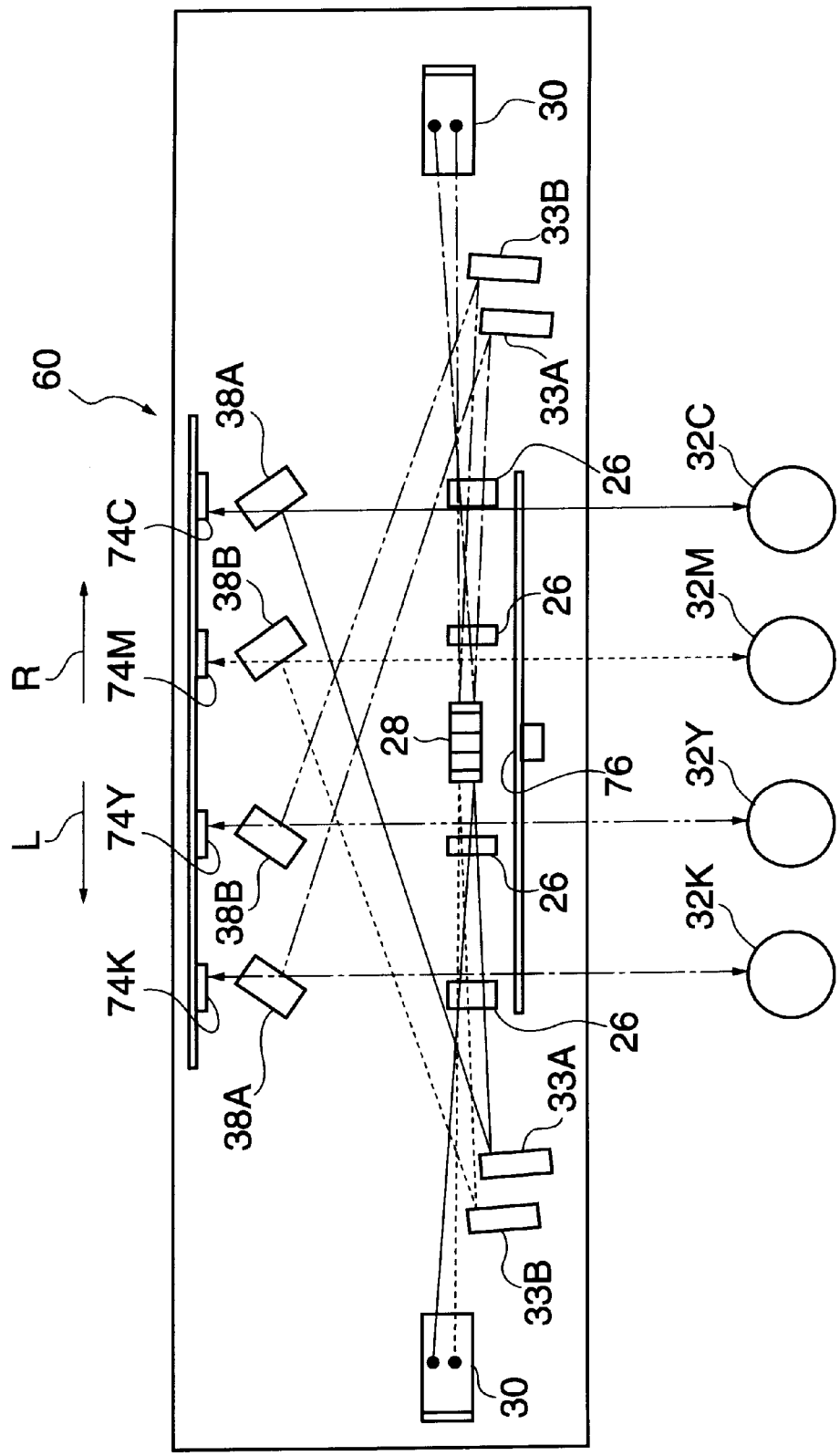
FIG. 8 is a front view showing the optical system of the optical scanner equivalent to the second embodiment.

As shown in FIG. 7, the optical scanner 60 equivalent to this embodiment is provided with a rotary polygon mirror 28 in the center of the bottom 64 (not shown in FIG. 7) of the optical box 62, and semiconductor lasers 18A and 18B, a reflector 29, a reflector 30, an fθ lens group 26, long plane mirrors 33A and 33B and cylindrical mirrors 38A and 38B are symmetrically arranged on both sides.

On both sides of the rotary polygon mirror 28 (a direction shown by an arrow L and a direction shown by an arrow R), a laser beam LBa from the semiconductor laser 18A via the reflector 29 and a laser beam LBb from the semiconductor laser 18B are respectively incident via the reflector 30 and the fθ lens group 26, however, the laser beam LBa and the laser beam LBb are different in an incident angle in the vertical scanning direction.

For example, the laser beam LBa outgoing from the semiconductor laser 18A on the side of the direction shown by the arrow R and deflected is reflected by the plane mirror 33A after it passes the fθ lens group 26, is reflected by the cylindrical mirror 38A after it passes over the rotary polygon mirror 28, passes in the vicinity of the fθ lens group 26 on the reverse side and is guided to a photoconductor 32K.

In the meantime, the laser beam LBb outgoing from the semiconductor laser 18B on the side of the direction shown by the arrow R and deflected is reflected by the plane mirror 33B after it passes the fθ lens group 26, is reflected by the cylindrical mirror 38B after it passes over the rotary polygon mirror 28, passes in the vicinity of the fθ lens group 26 on the reverse side and is guided to the photoconductor 32Y.

In this embodiment, a so-called front incident double path optical system that the laser beam LBa and the laser beam LBb are incident from the center of a scanning angle between the laser beam LBa and the laser beam LBb respectively reflected and deflected by the rotary polygon mirror 28 toward the center of the turning of the rotary polygon mirror 28 is also adopted.

As the optical system is composed so that the laser beam LBa the incident angle in the vertical scanning direction of which is larger out of two laser beams incident on the rotary polygon mirror 28 is incident on the lower side in height on the rotary polygon mirror 28 than the laser beam LBb the incident angle of which is small, an interval in the vertical scanning direction between the laser beam LBa and the laser beam LBb on the rotary polygon mirror 28 can be secured beforehand, the interval between the laser beam LBa and the laser beam LBb respectively reflected and deflected by the rotary polygon mirror 28 is extended, in consideration of the above, the interval between the laser beam LBa and the laser beam LBb after they respectively pass the fθ lens group 26 can be more easily secured and the arrangement of optical components such as the plane mirror 33 and the cylindrical mirror 38 on the downstream side is facilitated.

In this embodiment, as the optical system is composed so that the laser beam LBa and the laser beam LBb respectively reflected by the cylindrical mirrors 38A and 38B respectively pass in the vicinity of the fθ lens group 26, that is, pass the inside of the optical scanner 60 again, the dimension in a direction of the height of the optical scanner 60 can be reduced and distance between the optical scanner 60 and each photoconductor 32K, 32Y, 32M, 32C can be reduced.

As described above, the laser beam LBa outgoing from the semiconductor laser 18A on the side of the direction shown by the arrow R is scanned on the photoconductor 32K corresponding to black (BK), the laser beam LBb outgoing from the semiconductor laser 18B on the side of the direction shown by the arrow R is scanned on the photoconductor 32Y corresponding to yellow (Y), the laser beam LBb outgoing from the semiconductor laser 18B on the side of the direction shown by the arrow L is scanned on the photoconductor 32M corresponding to magenta (M) and the laser beam LBa outgoing from the semiconductor laser 18A on the side of the direction shown by the arrow L is scanned on the photoconductor 32C corresponding to cyan (C).

Figure 10:
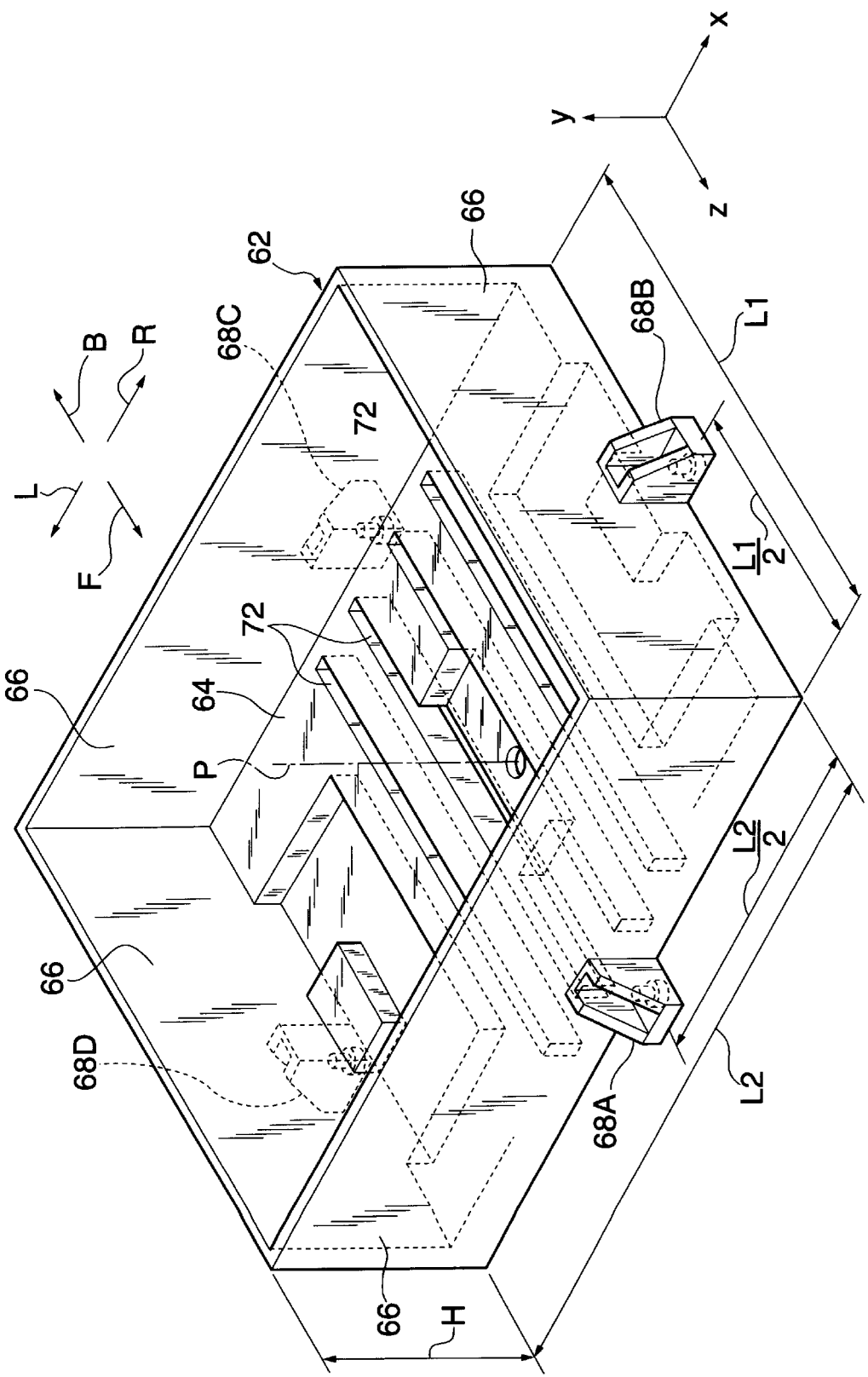
FIG. 10 is a perspective view showing an optical box for the optical scanner equivalent to the second embodiment.

As shown in FIGS. 9 and 10, fixed parts 68A, 68B, 68C, 68D are provided in the center on each side of the bottom 64.

A bolthole 70 is formed in the fixed part 68 and the optical box 62, that is, the optical scanner 60 is fixed to the frame 48 by screwing a bolt 44 (not shown) through the bolthole 70 into a screw hole (not shown) of the frame 48 of the image formation device.

As shown in FIG. 10, for the size of the optical box 62, L1 is 220 mm, L2 is approximately 280 mm, the height H is 90 mm and four slits 72 formed long in a direction shown by an arrow F and in a direction shown by an arrow B (directions perpendicular to the directions shown by the arrows L and R) for passing the above laser beams LBa and LBb are formed on the bottom 64.

Figure 11:
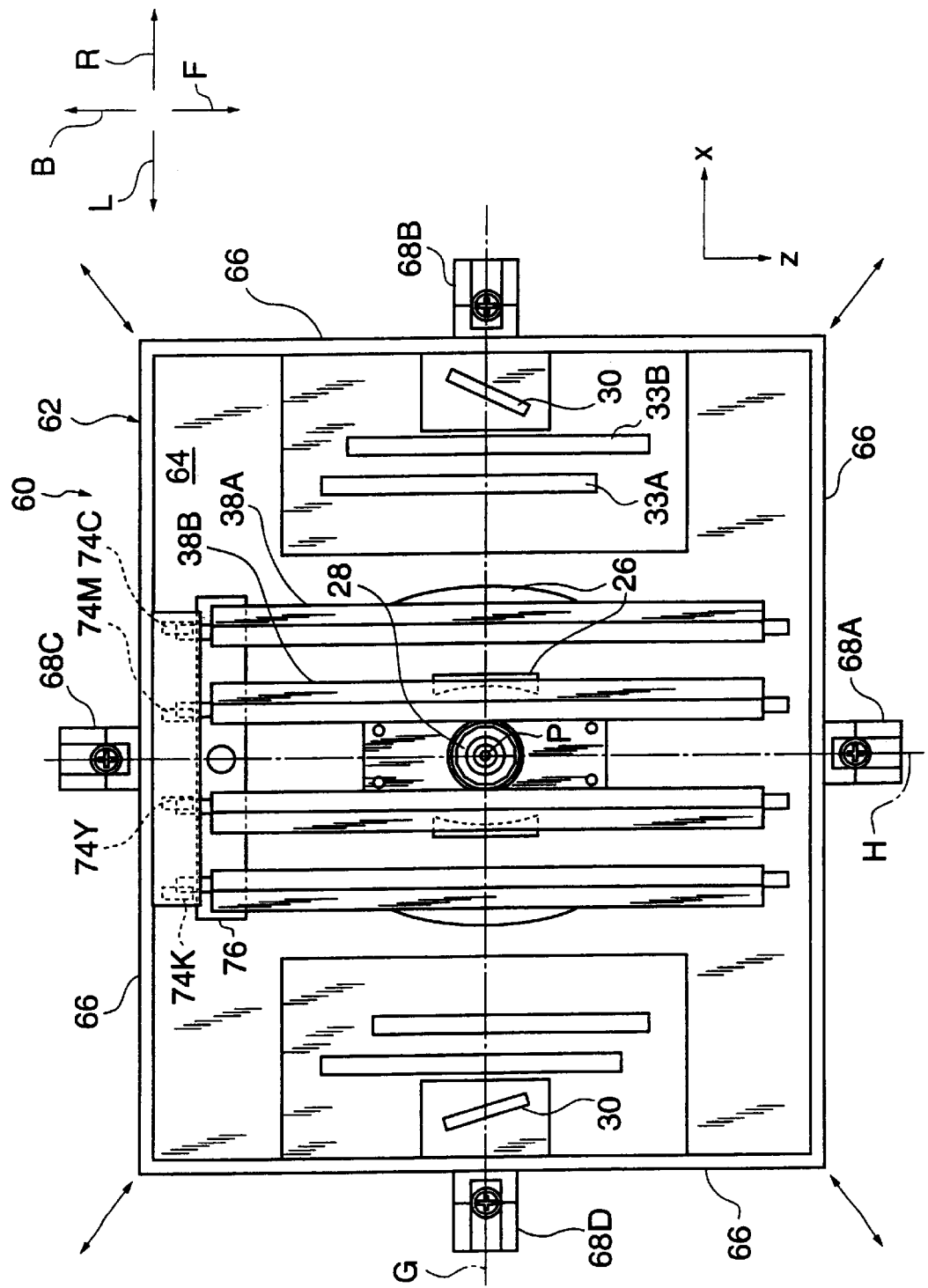
FIG. 11 is a plan showing the optical scanner equivalent to the second embodiment.
Figure 12:
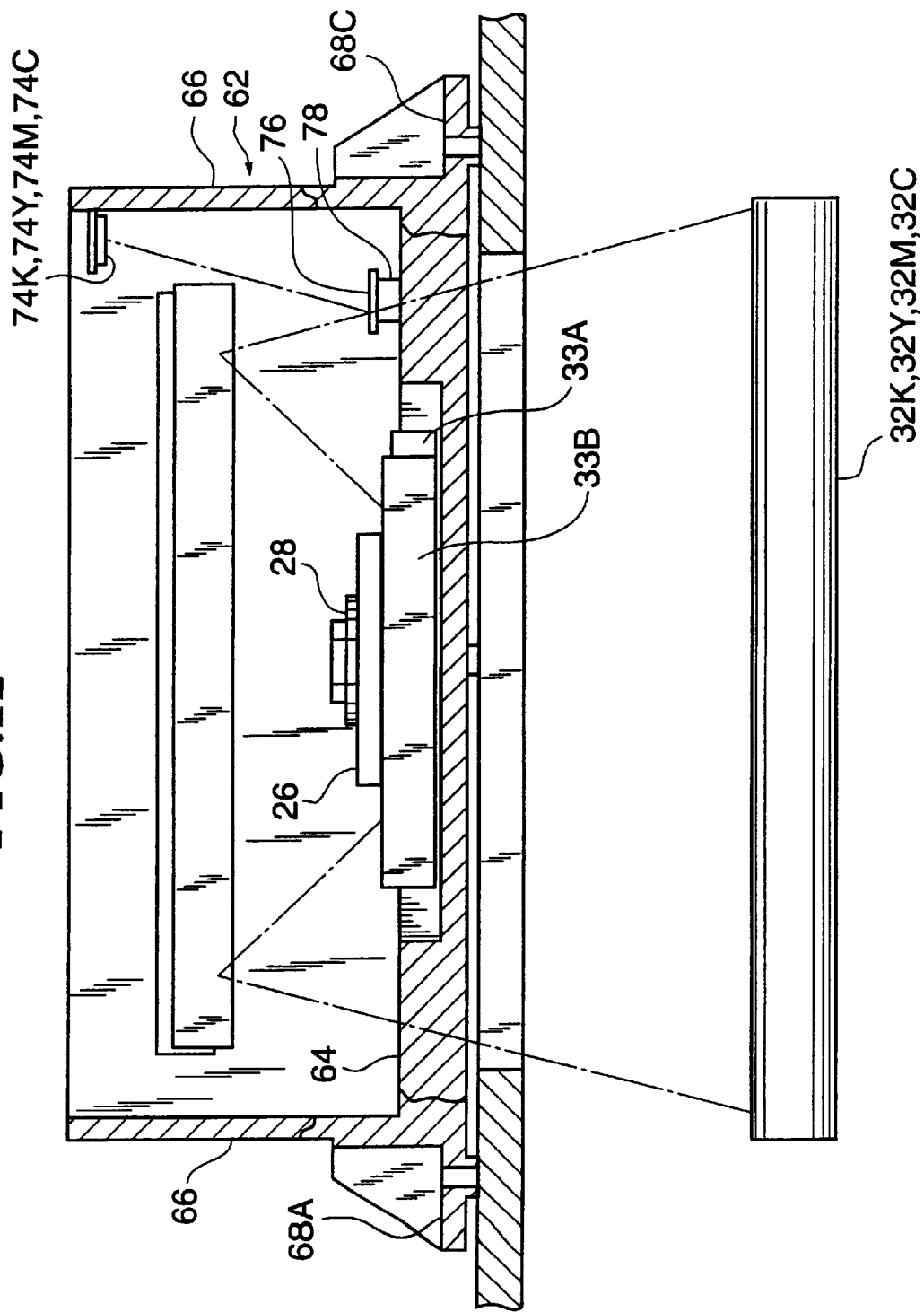
FIG. 12 is a side view showing the optical scanner equivalent to the second embodiment.

As shown in FIGS. 11 and 12, the fixed parts 68A and 68C and the fixed parts 68B and 68D are mutually provided in positions of point symmetry based upon the center P of the turning of the rotary polygon mirror 28 (not shown in FIG. 10), a line connecting symmetrical points, a line G connecting the fixed part 68B and the fixed part 68D in this embodiment is substantially coincident with the optical axis of the fθ lens group 26 and a line H connecting the other symmetrical points, that is, the fixed part 68A and the fixed part 68C is substantially parallel to the horizontal scanning direction (the directions shown by the arrows F and B).

In this embodiment, distance between the fixed part 68A or the fixed part 68C and each vertex is set to L2/2 (that is, the center of each side) and distance between the fixed part 68B or the fixed part 68D and each vertex is set to L1/2 (that is, the center of each side).

The optical box 62 in this embodiment is made of aluminum (coefficient of linear expansion $2.39 \times 10^{-5}$ mm/° C.) and the frame 48 of the image formation device is made of iron (coefficient of linear expansion $1.17 \times 10^{-5}$ mm/° C.).

Under these conditions, the deformation of the optical box 62 when temperature around the optical box 62 rises up to 35° C. is simulated using a finite element method.

Figure 13:
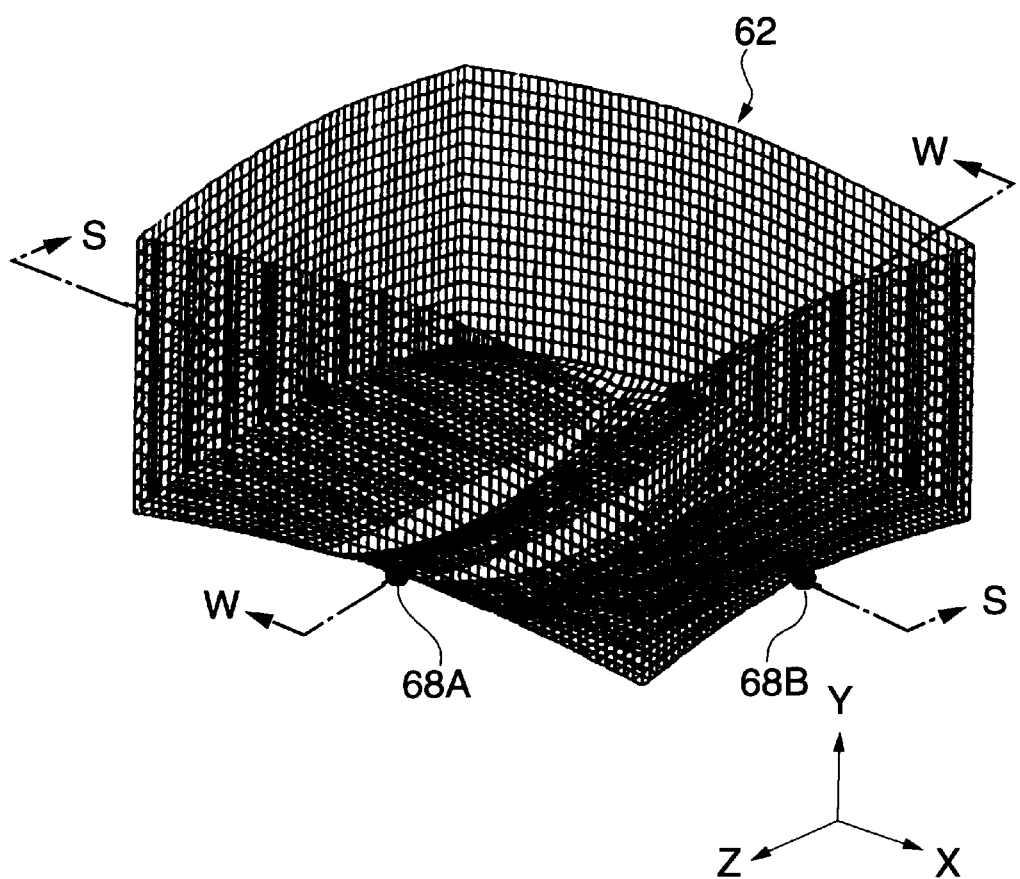
FIG. 13 is a perspective view showing the deformation of the optical box for the optical scanner equivalent to the second embodiment.

FIG. 13 shows a state in which the whole optical box 62 is deformed in a direction shown by an arrow Y. For reference, the result of the simulation of the deformation of an optical box 62' in the above state in case the conventional type fixing method (the optical box is fixed to the frame in the vicinity of the vertex of the outside shape of the optical box) is applied is shown in FIG. 14.

Figure 14:
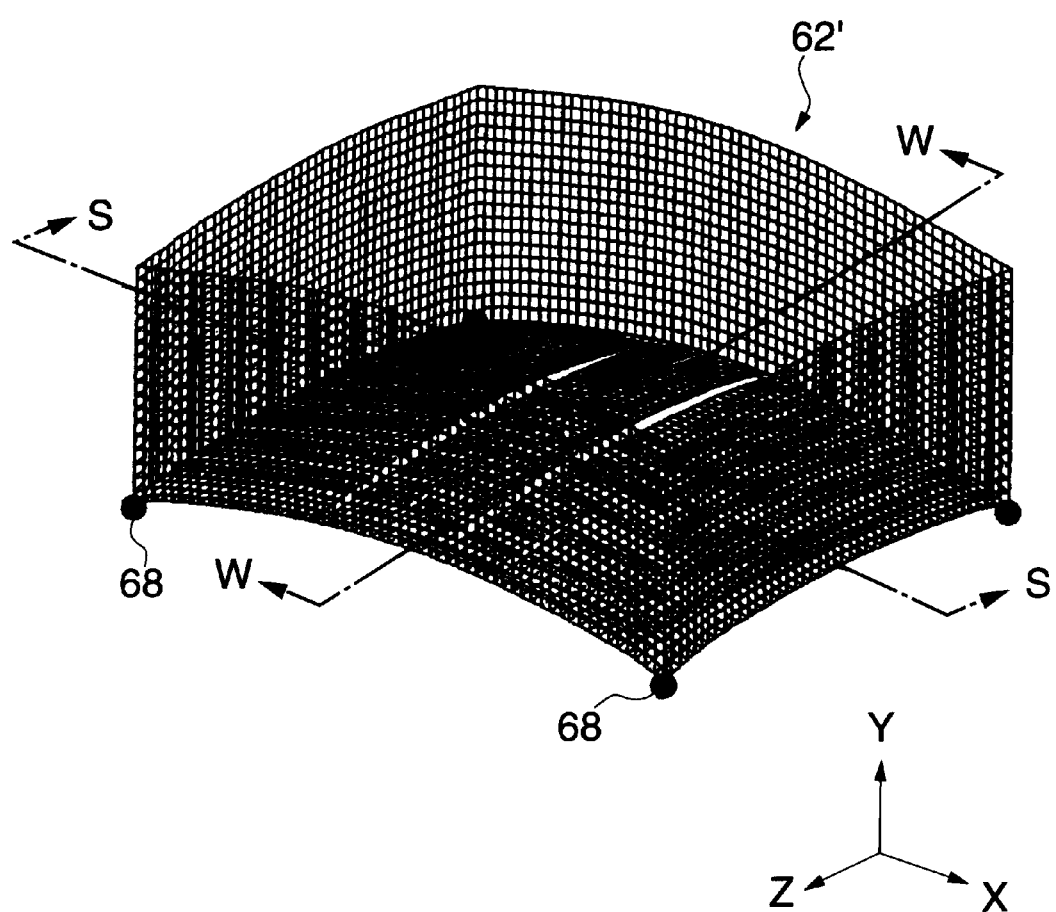
FIG. 14 is a perspective view showing deformation when a conventional type fixing method is applied to the optical box for the optical scanner equivalent to the second embodiment.
Figure 15:
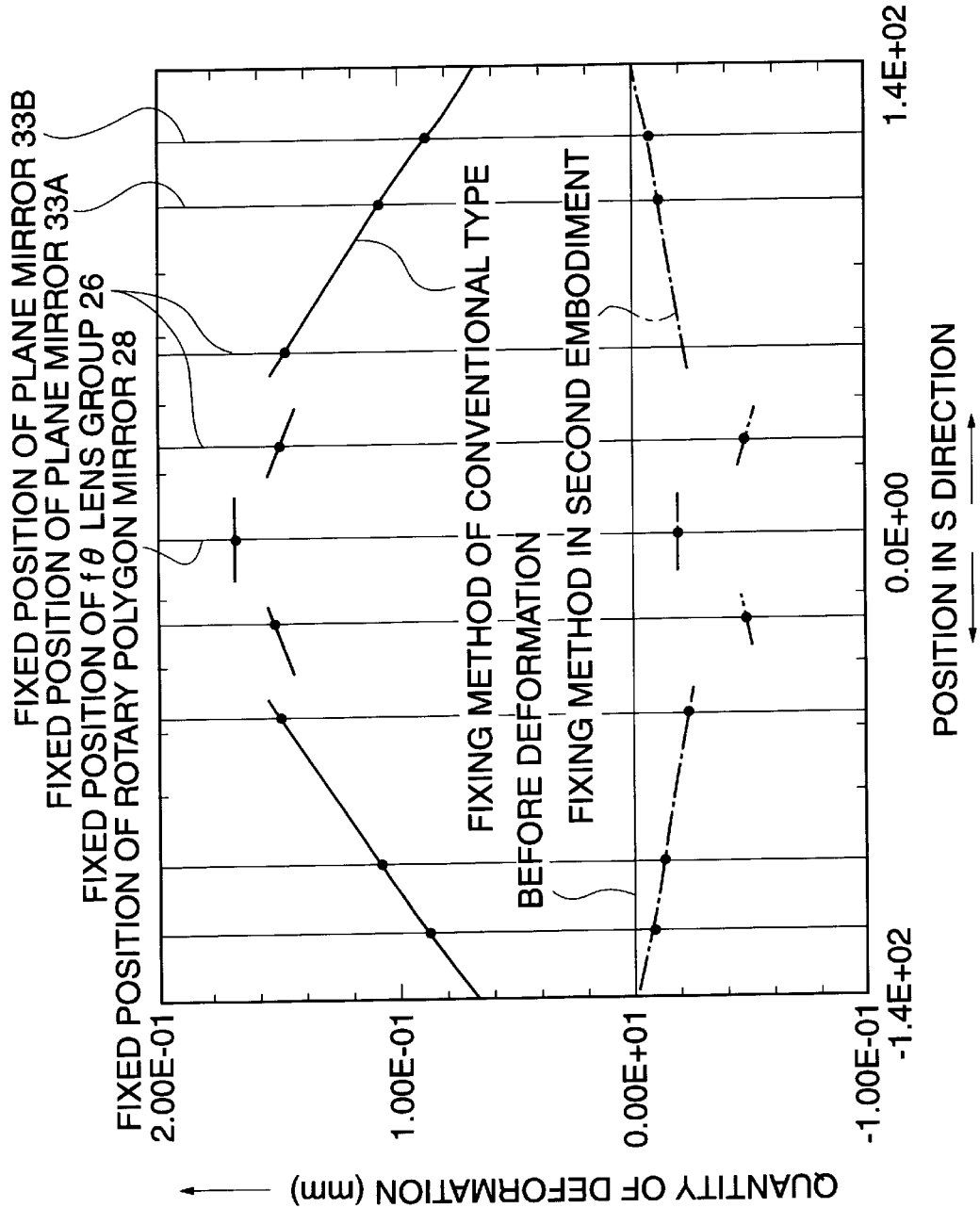
FIG. 15 is a graph showing the quantity of deformation in a direction shown by an arrow S of the optical box shown in FIG. 13 and the optical box shown in FIG. 14.
Figure 16:
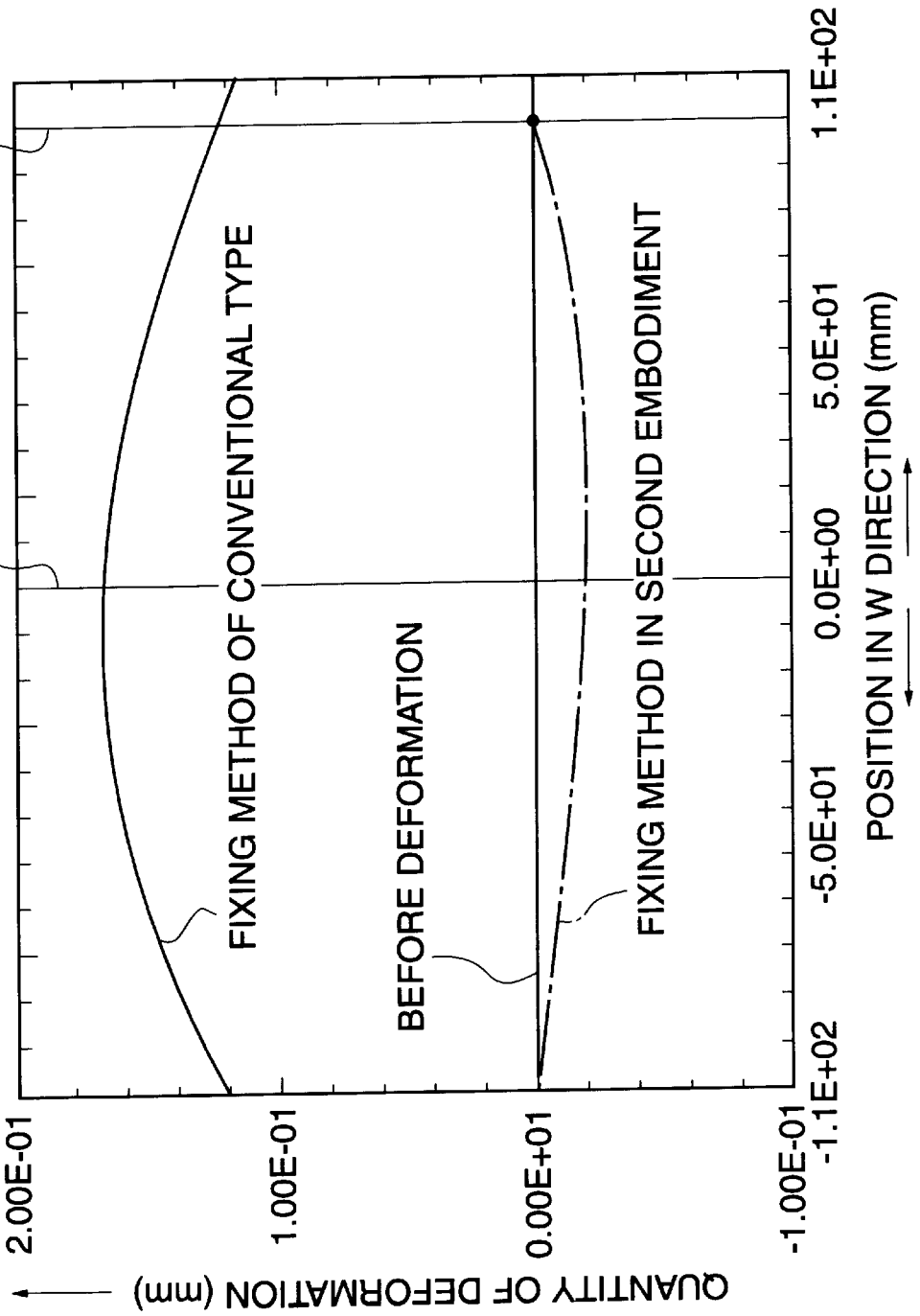
FIG. 16 is a graph showing the quantity of deformation in a direction shown by an arrow W of the optical box shown in FIG. 13 and the optical box shown in FIG. 14.

FIG. 15 is a graph showing the quantity of deformation in each position when the deformation shown in FIGS. 13 and 14 is viewed from a cross section shown by an arrow S and FIG. 16 is a graph showing the quantity of deformation in each position when the deformation shown in FIGS. 13 and 14 is viewed from a cross section shown by an arrow W.

The position of the cut surface S shown in FIG. 15 is located in approximately the same position as the optical axis of the fθ lens group 26 in the optical scanner 60 shown in FIG. 11 and the cut surface passes parts in which the plane mirror 30, the rotary polygon mirror 28 and the long plane mirrors 33A and 33B are attached.

If the optical box 62 is fixed as in this embodiment, the deformation on the bottom 64 is smaller as in the first embodiment, compared with the deformation in the conventional type fixed position though deformation is found around the slit 72 provided to the optical box 62 for passing a laser beam and the optical box is not locally deformed though overall extension is caused as a whole.

When the variation of the attitude of each reflector according to the fixing method in this embodiment and according to the conventional type fixing method is calculated based upon these results and is converted to the variation of the optical path, a laser beam is off by 1 mm or more in the vertical scanning direction immediately before the cylindrical mirror 38 in the conventional type fixing method.

In the meantime, when the variation of the optical path is similarly calculated based upon the results in this embodiment, the above variation is reduced up to approximately ¼ of the quantity of variation in the conventional type fixing method and can be reduced up to the quantity of variation which meets optical characteristics.

As shown in the graph in FIG. 16, the quantity of deformation is also not greatly improved in the direction of the cut surface W.

It is verified that as to the variation of the optical path according to the fixing method in this embodiment, the result that temperature is changed and the variation of the optical path is actually measured and the result of simulation substantially show the same value and as to the characteristics of a light beam on the photoconductor 32, required characteristic values are also met.

The opening in the upper part of the optical box 62 may also be covered with a cover member not shown as in the above optical scanner 10.

The cover member is made of material the rigidity of which is higher than that of the optical box 62, for example rigid metal such as iron and is fixed in the vicinity J1, J2, J3, J4 of the vertex of each side of the outside shape of the optical box 62 by a screw as shown in FIG. 9.

If the fixed part 68 of the optical box 62 to which the cover member is not attached is fixed to the frame 48, a vibration mode that the corner of the optical box 62 is vibrated in a direction shown by an arrow V as shown in FIG. 11 occurs.

However, in this embodiment, the cover member functions as a reinforcement by fixing the cover member to the optical box 62 and rigidity as the whole optical scanner 60 can be enhanced. Therefore, the above vibration mode is prevented and speedup is enabled.

In the optical scanner 60, a light receiving element guide mirror 76 for guiding laser beams to light receiving elements 74K, 74Y, 74M, 74C for detecting the position of a scanning line formed by laser beams LBa and LBb reflected by the cylindrical mirrors 38A and 38B as shown in FIGS. 9, 11 and 12 toward the photoconductors 32K, 32Y, 32M, 32C is provided not every laser beam but on the bottom 64 singly.

As by composing as described above, a light receiving element guide mirror is not required to be provided every laser beam and a part for holding the light receiving element guide mirror is not required to be separately provided, the relative dispersion of each laser beam due to the dispersion of the precision of each holding part can be prevented.

The holding part 78 of the light receiving element guide mirror 76 is provided in the vicinity of the fixed part 68C.

As shown in FIG. 16, as there is little deformation of the optical box 62 due to the change of temperature in the vicinity of the fixed part 68C (the vicinity of the right end of the graph), an optical path between the light receiving element guide mirror 76 and each light receiving element 74K, 74Y, 74M, 74C is substantially not varied by fixing the light receiving element guide mirror 76 in the above location.

Therefore, even if a scanning line on the photoconductors 32K, 32Y, 32M, 32C is deflected due to the change of temperature, the variation of the scanning line on the photoconductors 32K, 32Y, 32M, 32C can be respectively detected by the light receiving elements 74K, 74Y, 74M, 74C in the optical scanner 60 and can be corrected based upon detection information from the light receiving elements 74K, 74Y, 74M, 74C.

As only the single light receiving element guide mirror 76 for guiding laser beams LBa and LBb to the light receiving elements 74K, 74Y, 74M, 74C is provided as described above even if the optical path is slightly deflected, the variation of four laser beams are equal.

Further, the light receiving element 74K and the light receiving element 74Y in this embodiment for detecting the position of each scanning line formed by the laser beams LBa and LBb on one side (on the side of the direction shown by the arrow R) of the symmetrical optical systems arranged on both sides of the rotary polygon mirror 28 are also respectively provided with a function for detecting the position in the horizontal scanning direction and in the vertical scanning direction.

By composing as described above, in a color image formation device wherein the variation of each scanning line is serious, as the quantity of the variation of both light beams of the symmetrical optical systems is equal by fixing method in this embodiment even if the variation of a scanning line due to the change of temperature in the device in the vertical scanning direction exceeds an allowable value after initial regulation, laser beams LBa and LBb on one side (on the side on which the laser beams are not incident on the light receiving elements 74K and 74Y) can be corrected based upon detection information from the light receiving elements 74K and 74Y in the optical scanner 60.

Figure 20:
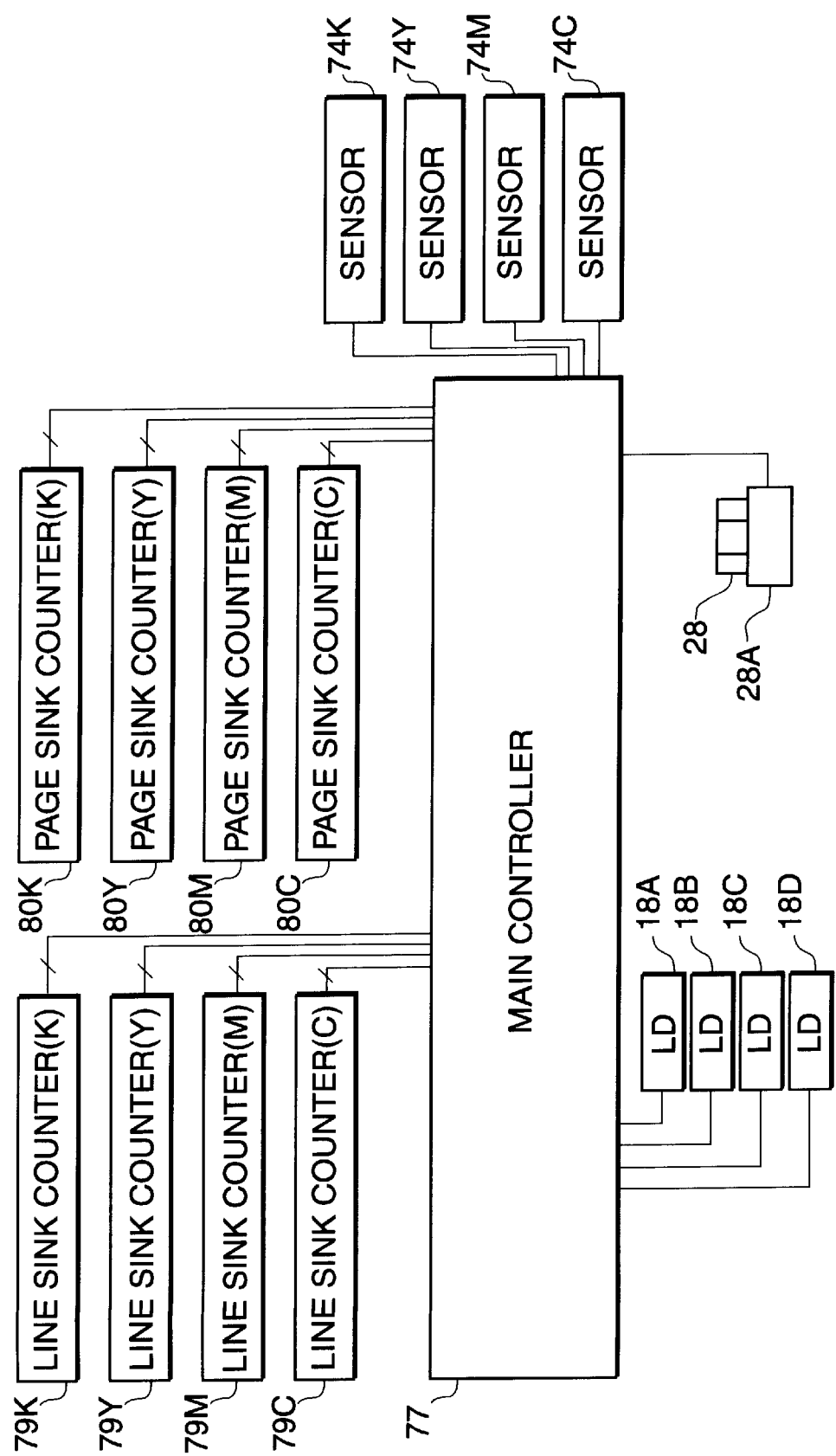
FIG. 20 is a block diagram showing a control section for correcting a scanning line.

As shown in FIG. 20, in the image formation device, a main controller 77 is provided, and line sink counters 79K, 79Y, 79M, 79C, page sink counters 80K, 80Y, 80M, 80C, the light receiving elements 74K, 74Y, 74M, 74C, the semiconductor lasers 18A and 18B and the motor 28M for driving the rotary polygon mirror 28 and others are connected to the main controller 77.

Laser beams LBa and LBb can be registered in the vertical scanning direction using set data in the page sink counters 80K, 80Y, 80M, 80C provided for every laser beam as shown in FIG. 20, for the correction and control of the variation of a scanning line due to the above change of temperature, the variation of the laser beams LBa and LBb is respectively monitored by the light receiving elements 74K and 74Y and if the laser beams are deflected, set data in the page sink counters 80K and 80Y is updated and the variation can be corrected.

In this case, as the direction of misregistration is reverse though the variation of laser beams LBa and LBb respectively outgoing from the semiconductor lasers 18A and 18B on the side of the direction shown by the arrow L and the variation of laser beams LBa and LBb respectively outgoing from the semiconductor lasers 18A and 18B on the side of the direction shown by the arrow R are equal, data applied to the page sink counters 80M and 80C is reverse data.

Other Embodiments

Figure 17:
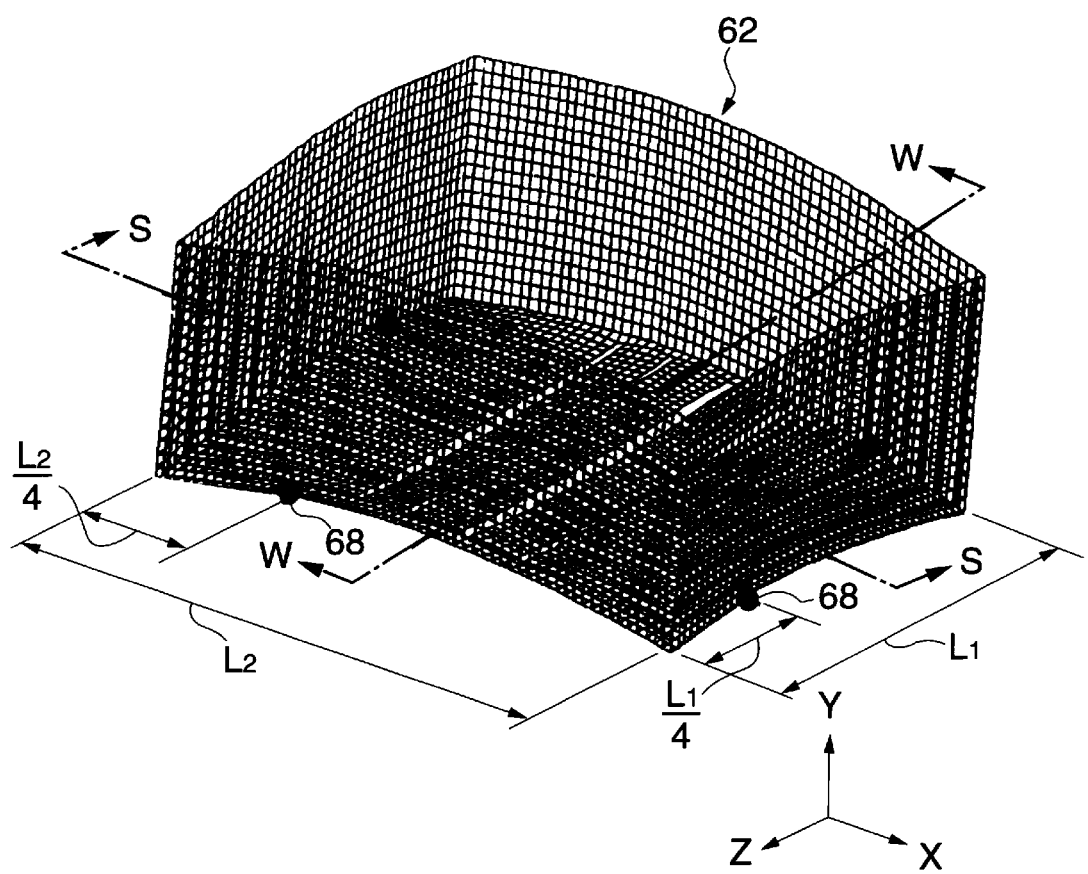
FIG. 17 is a perspective view showing the deformation of an optical box for an optical scanner equivalent to another embodiment.

In the optical box 62 in the above second embodiment, if distance between each fixed part 68 and each vertex is Ln/2 (that is, the center of each side) if distance between vertexes is Ln, however, as shown in FIG. 17, in an optical box 82 in this embodiment, each fixed part 68 is provided in a position apart from each vertex by Ln/4.

Figure 18:
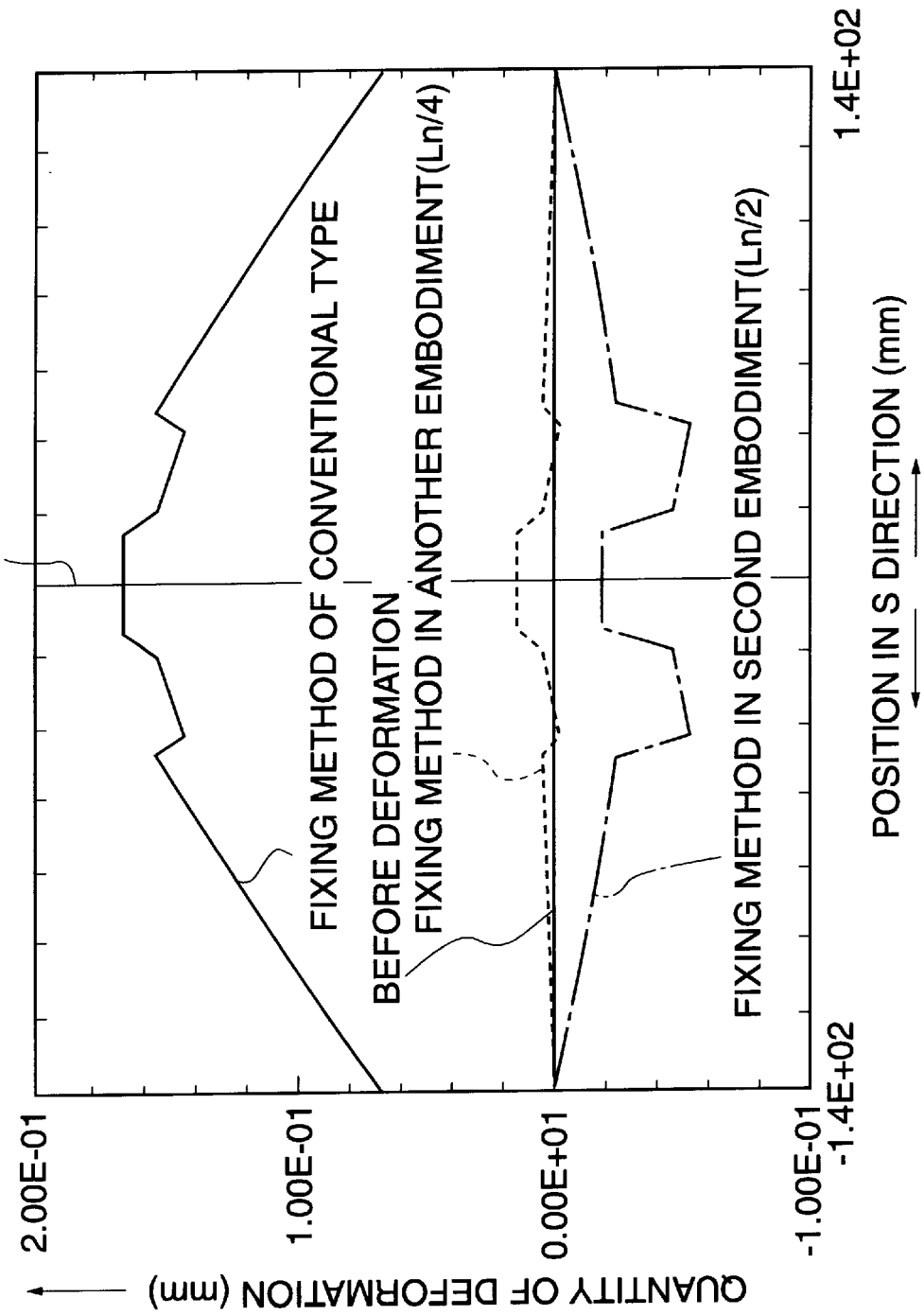
FIG. 18 is a graph showing the quantity of deformation in the direction shown by the arrow S of the optical box shown in FIG. 17.
Figure 19:
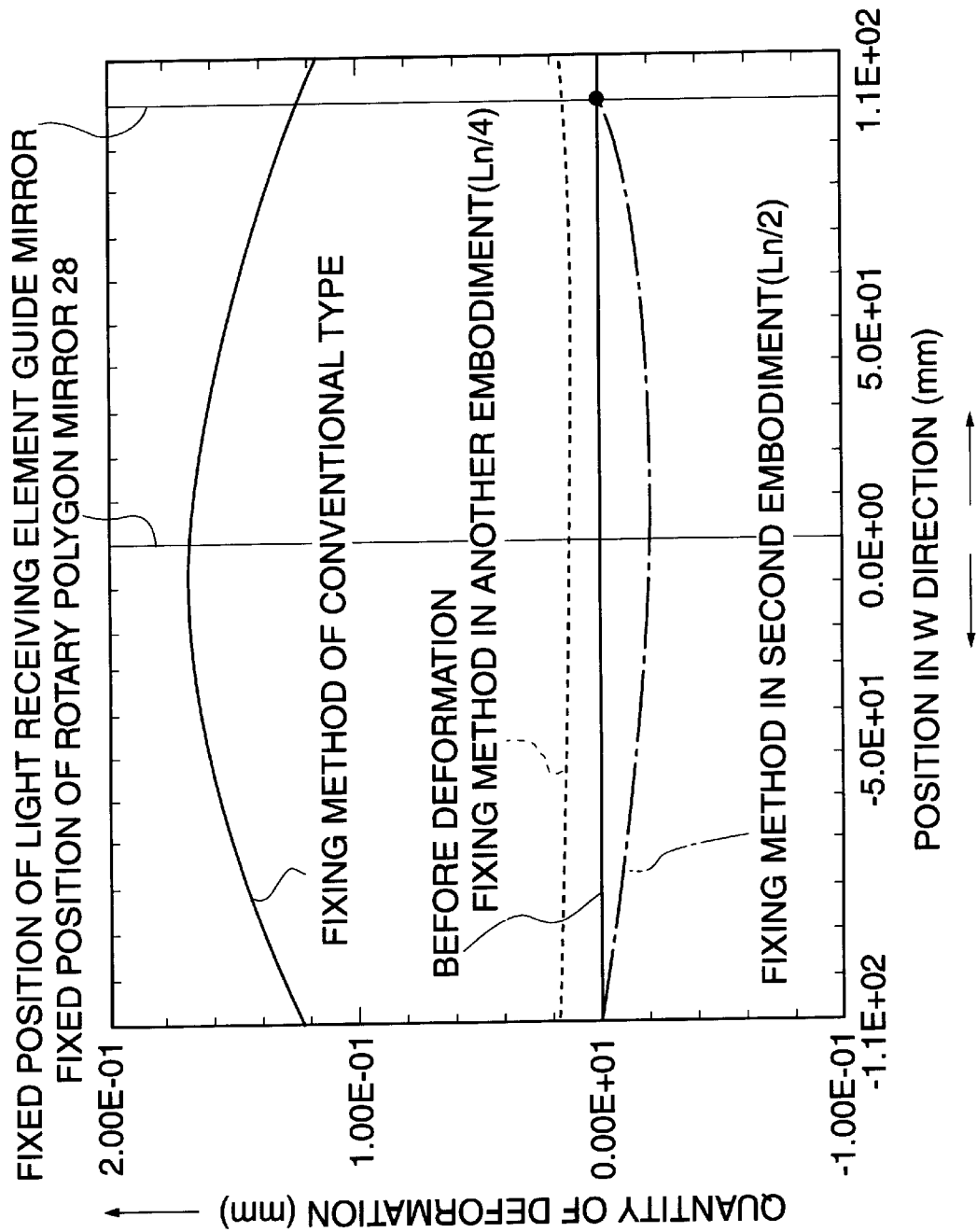
FIG. 19 is a graph showing the quantity of deformation in the direction shown by the arrow W of the optical box shown in FIG. 17.

FIG. 18 shows the quantity of deformation when the optical box 82 shown in FIG. 17 is viewed from a cross section shown by an arrow S and FIG. 19 shows the quantity of deformation when the above optical box is viewed from a cross section shown by an arrow W.

In the optical box 82 in this embodiment, the quantity of deformation is further more reduced in both directions shown by the arrows S and W than that in case the optical box is fixed in a position apart from each vertex by Ln/2 (that is, in the center on each side) though a mode of deformation is different from that when the fixed part 68 is provided in a position apart from each vertex by Ln/2 (in the second embodiment).

As described above, the quantity of deformation of the optical box 82 can be reduced by avoiding providing the fixed part in the vicinity of each vertex though the fixed part is not required to be provided in a position greatly apart from each vertex and limiting the fixed part 68 in one location of each side.

Figure 21:
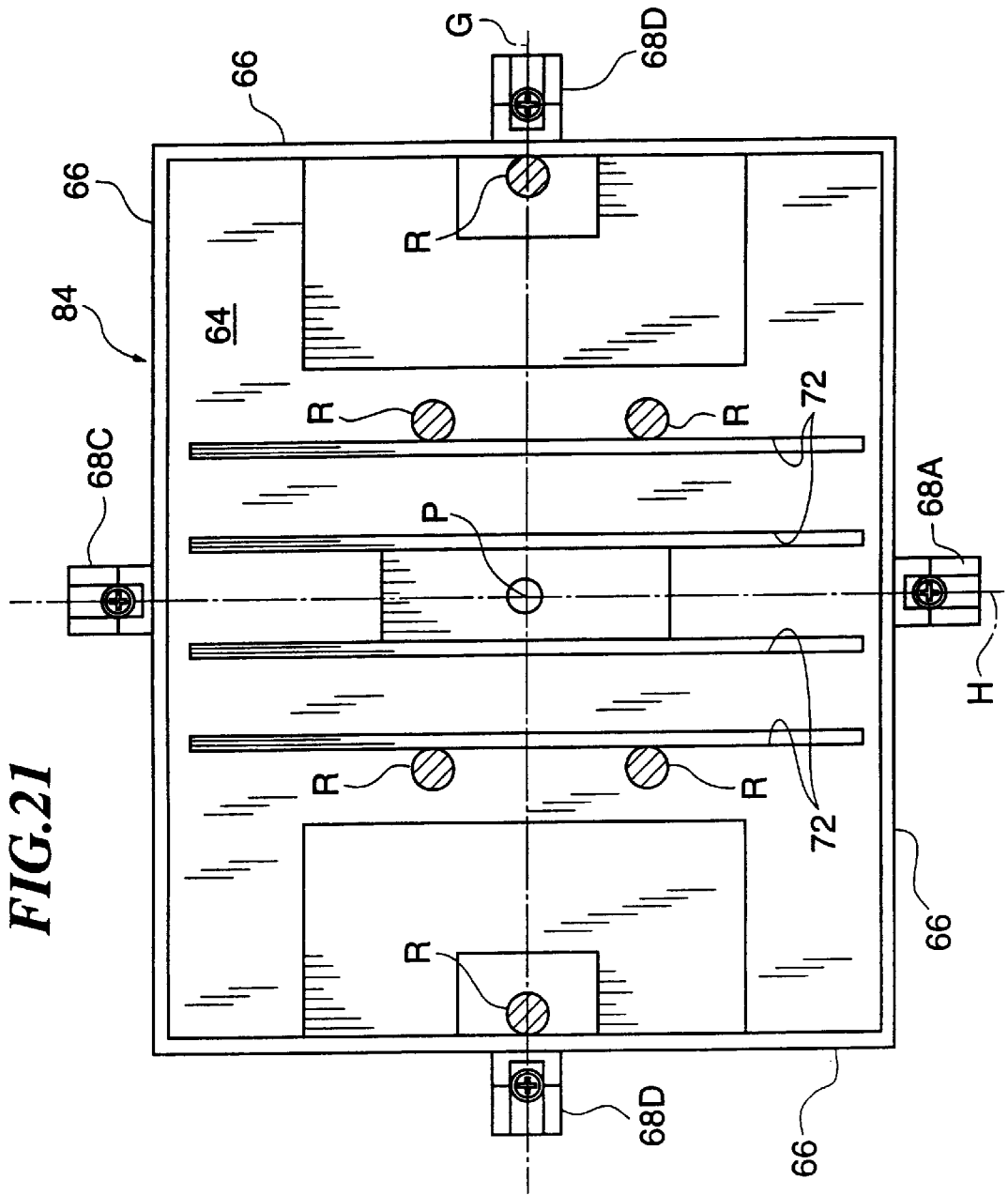
FIG. 21 is a plan showing an optical box made of resin for an optical scanner equivalent to further another embodiment.
Figure 22:
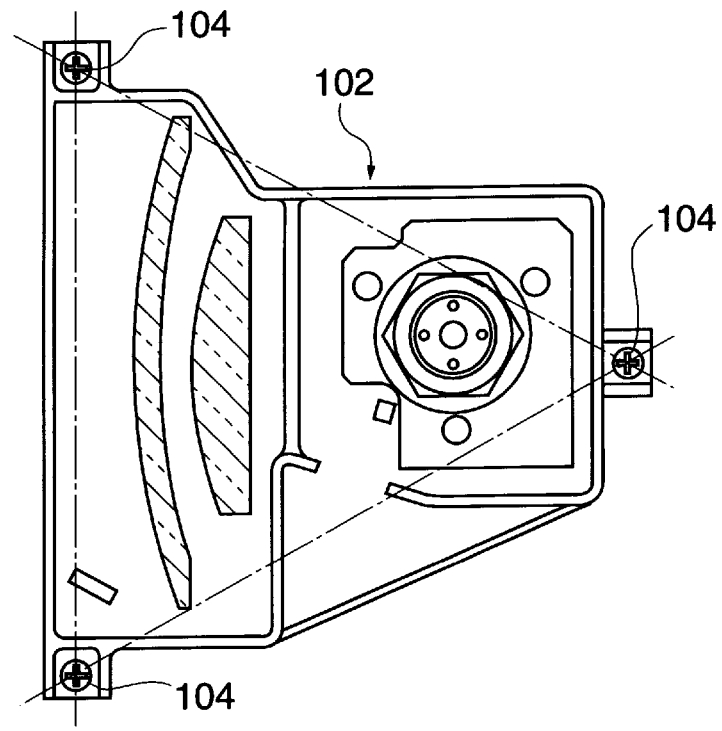
FIG. 22 is a plan showing fixed positions of a conventional type optical scanner.
Figure 23:
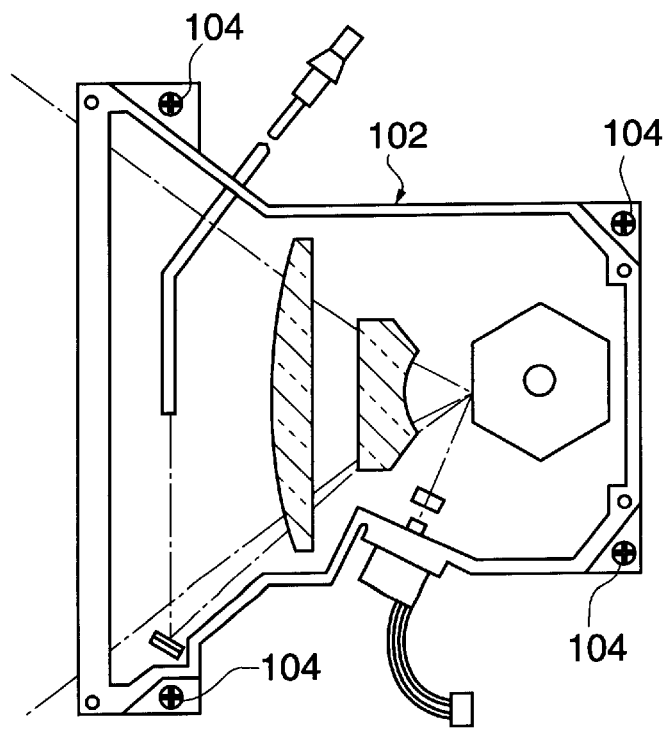
FIG. 23 is a plan showing fixed positions of another conventional type optical scanner.
Figure 24:
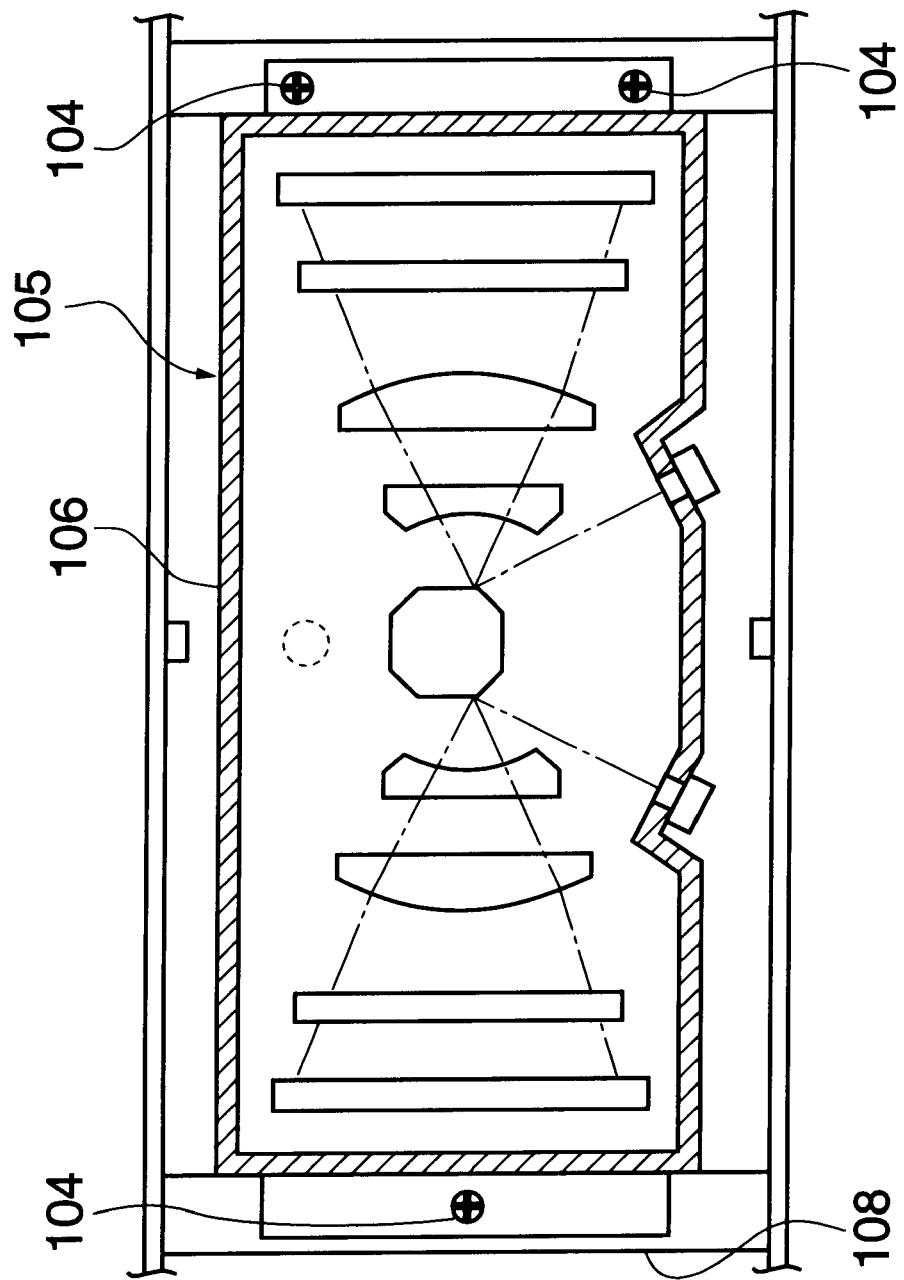
FIG. 24 is a plan showing fixed positions of an optical scanner for a conventional type color image formation device.
Figure 25A:
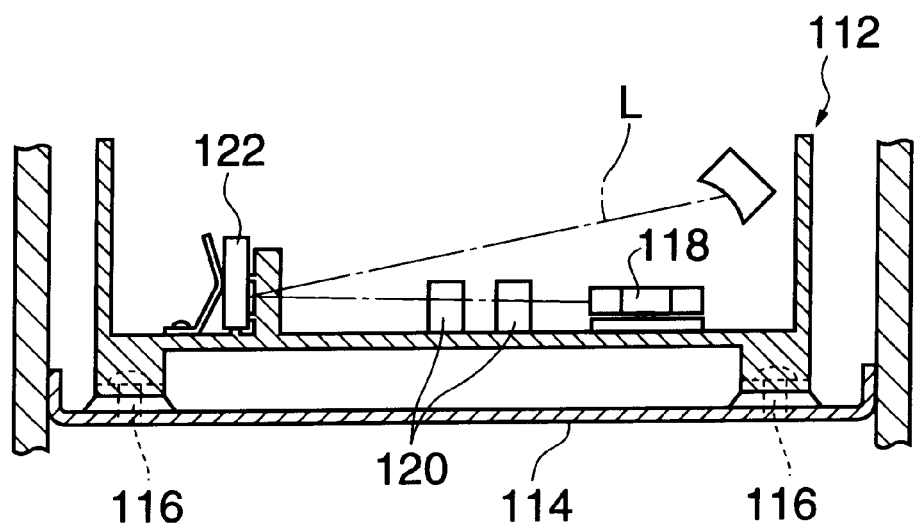
FIG. 25A is a side view showing an optical path of an optical system of an optical scanner before an optical box is deformed and FIG. 25B is a side view showing an optical path of the optical system after the optical box is deformed.
Figure 25B:
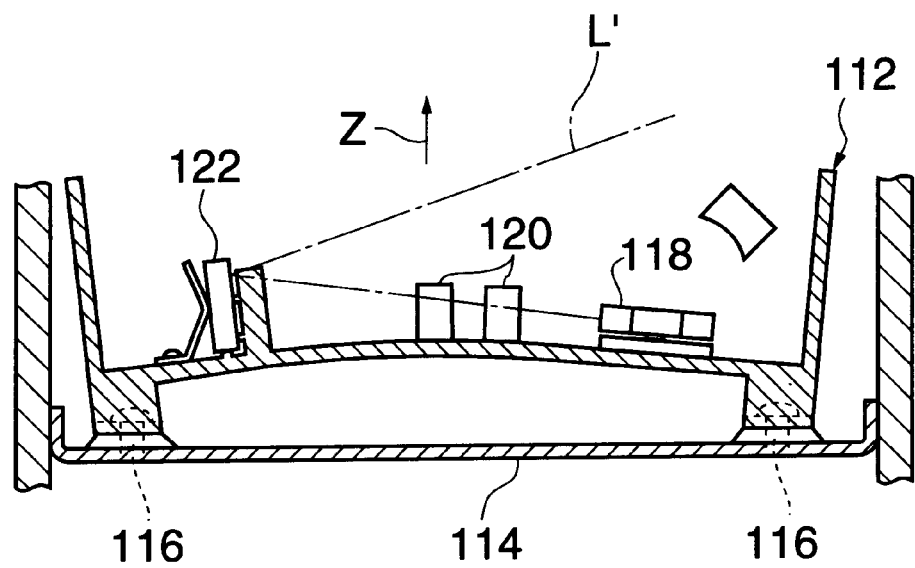
Figure 26:
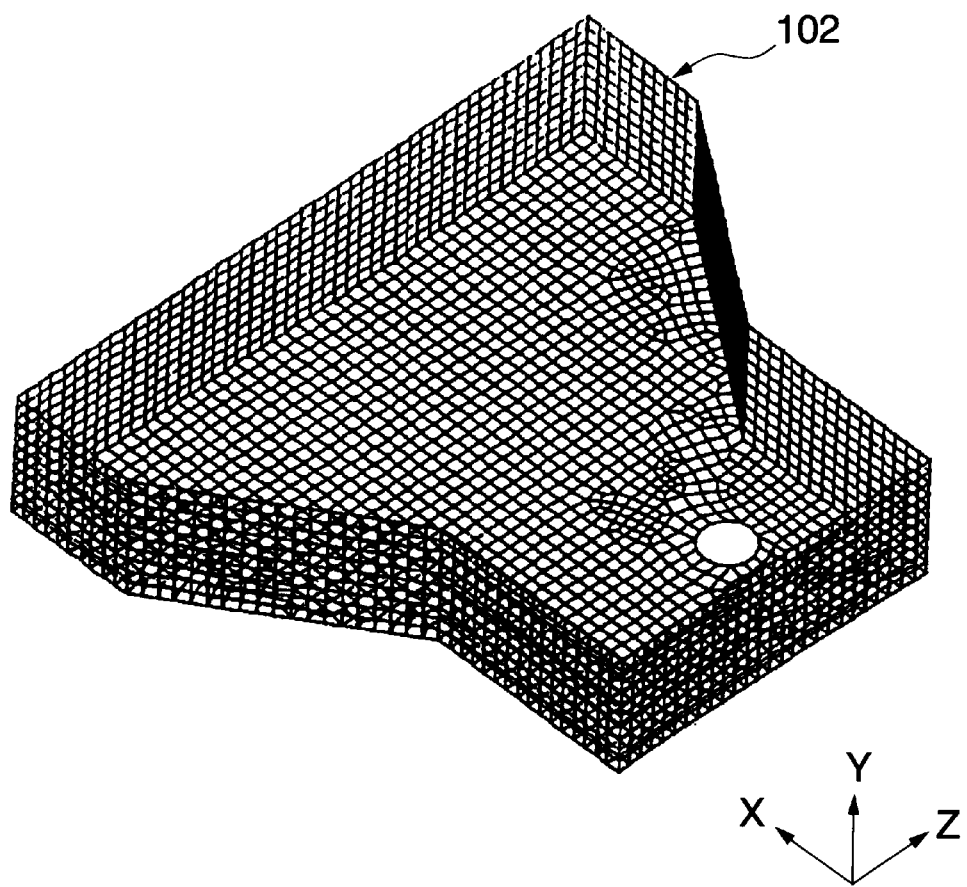
FIG. 26 is a perspective view showing the shape of a simple model of a conventional type optical box.
Figure 27:
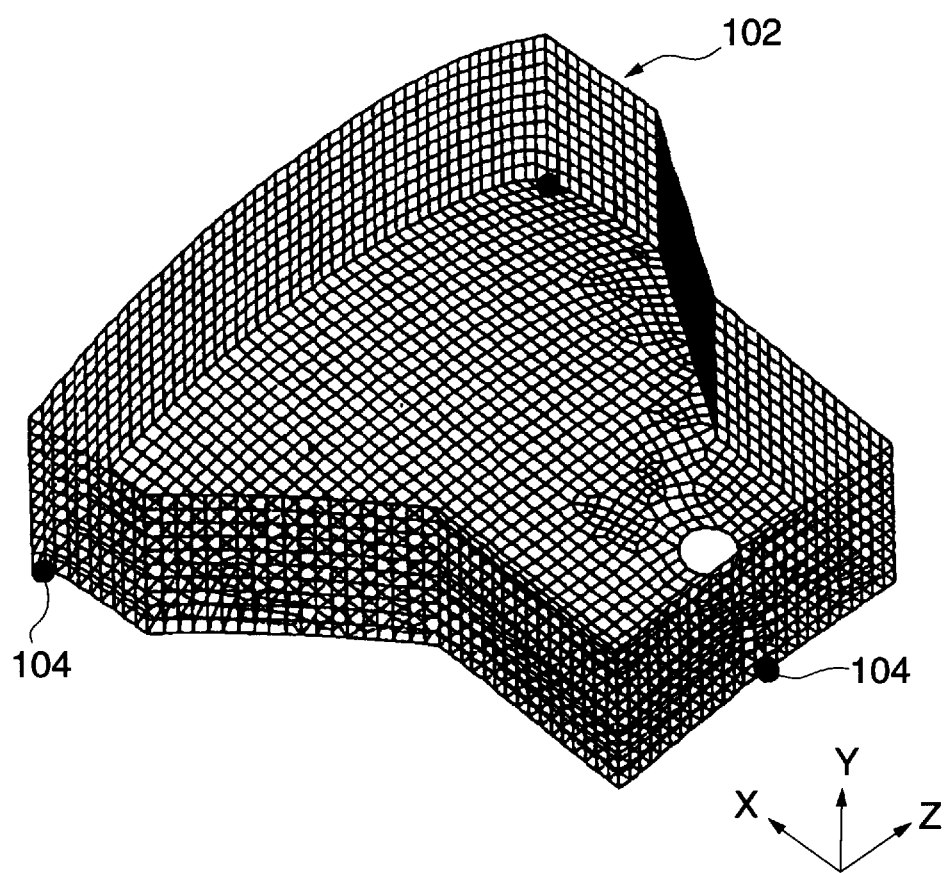
FIG. 27 is a perspective view showing the deformation of the conventional type optical box fixed at three points.
Figure 28:
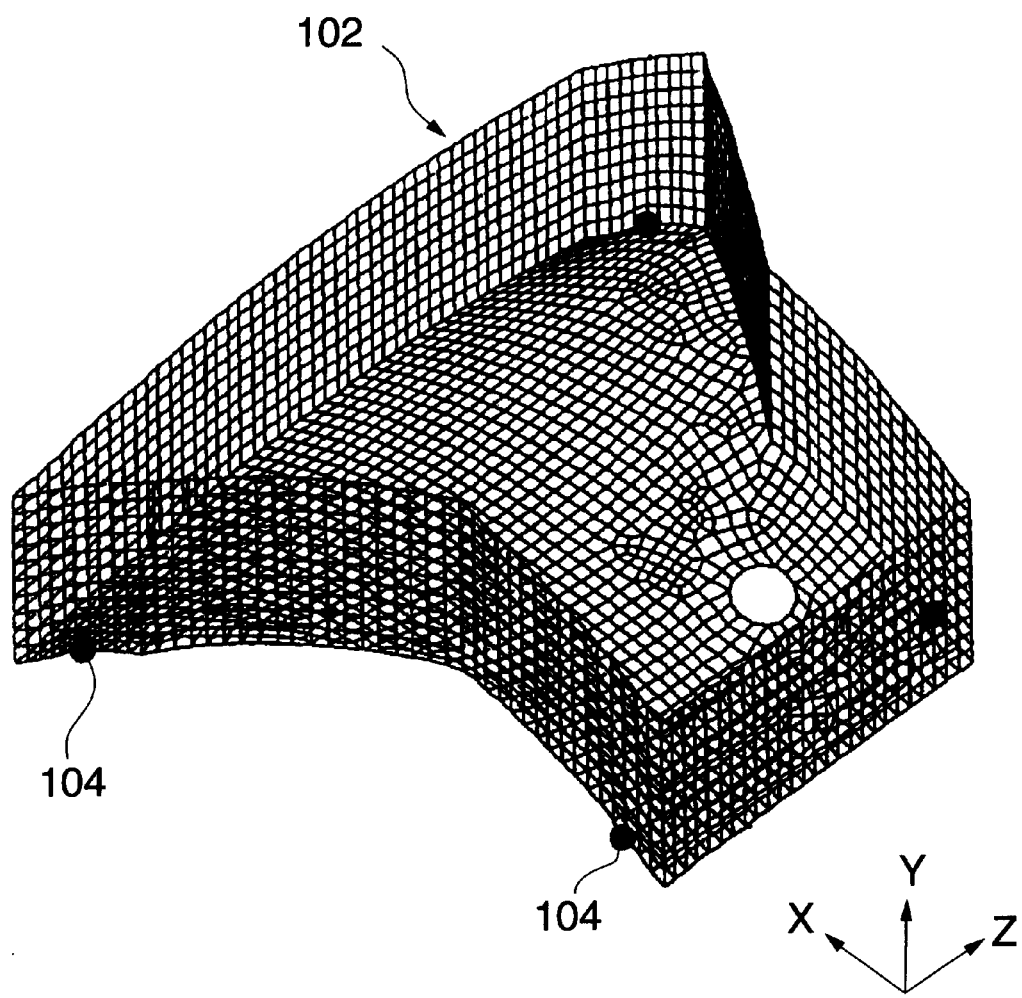
FIG. 28 is a perspective view showing the deformation of the conventional type optical box fixed at four points.
Figure 29:
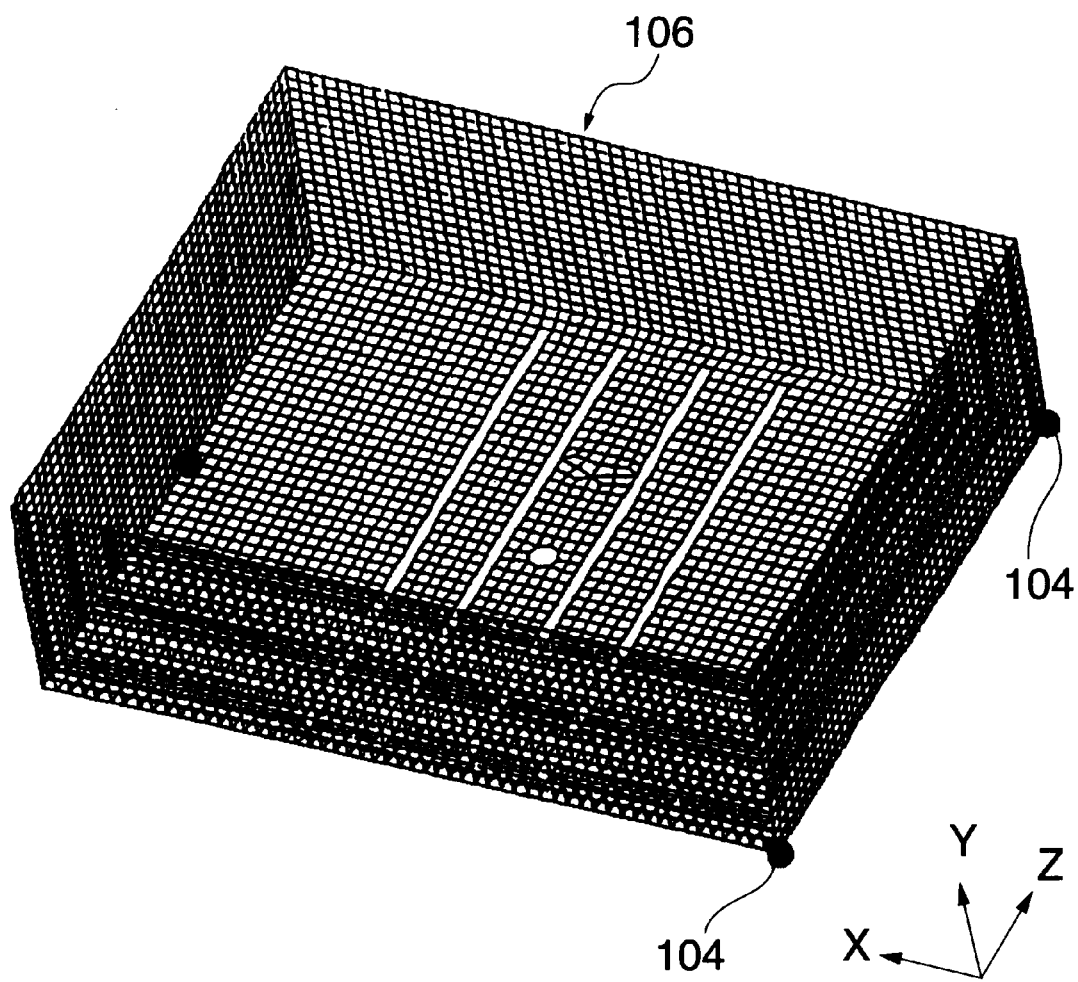
FIG. 29 is a perspective view showing the shape of a simple model of another conventional type optical box.
Figure 30:
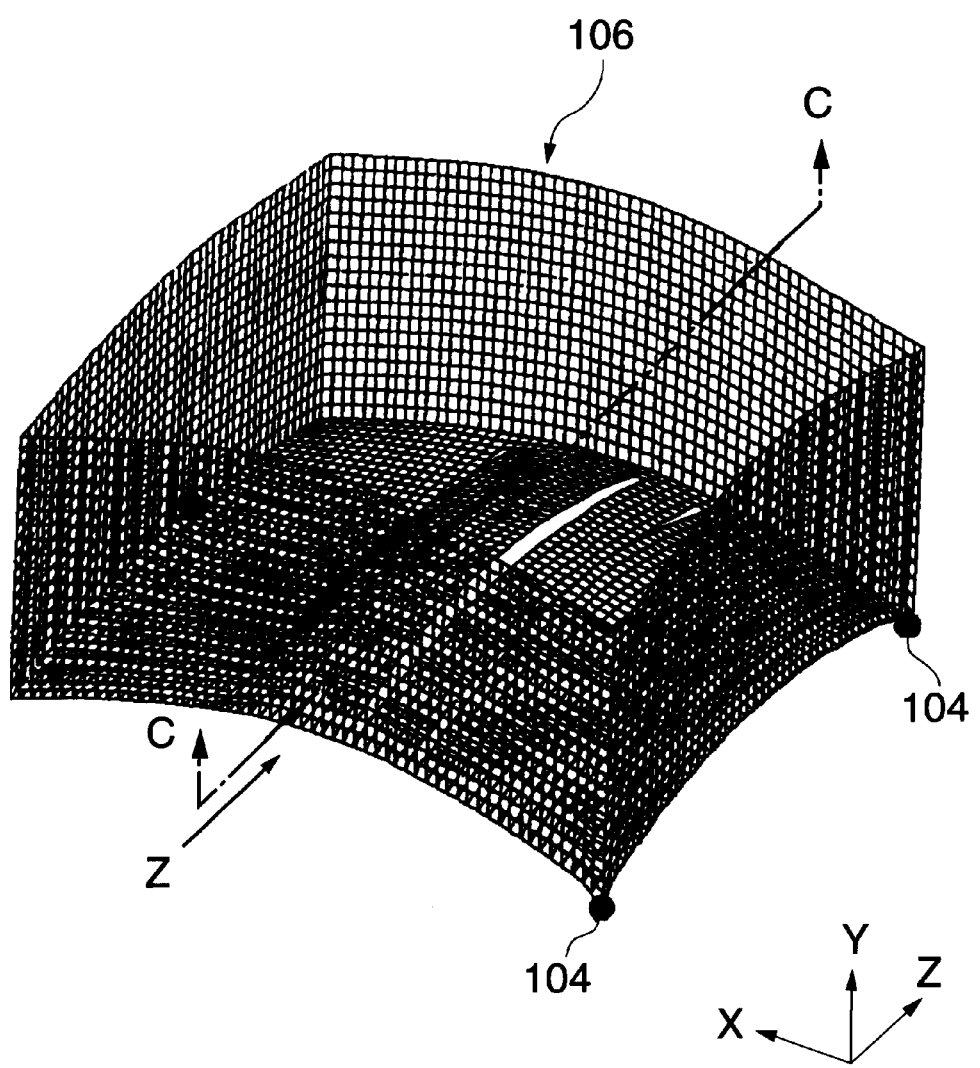
FIG. 30 is a perspective view showing the shape of the deformation of still another conventional type optical box fixed at three points.
Figure 31:
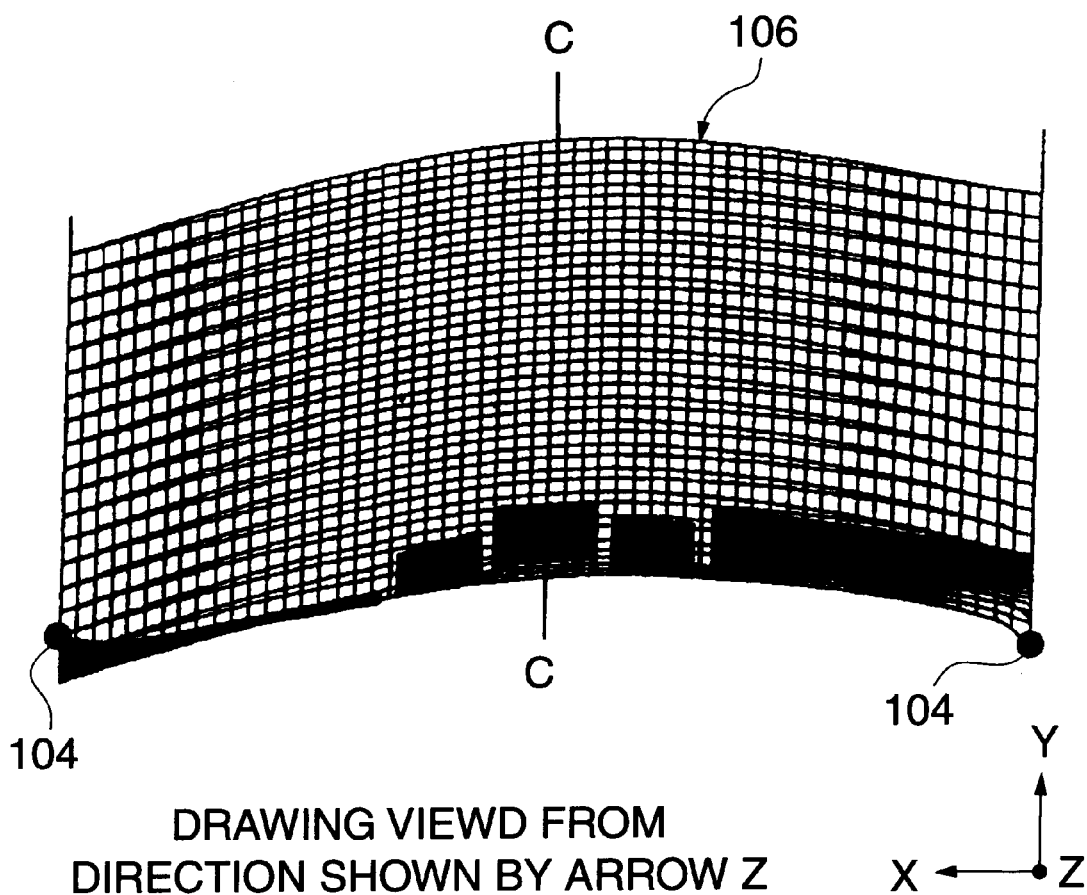
FIG. 31 is a side view showing the shape of the deformation of yet another conventional type optical box fixed at three points.
Figure 32:
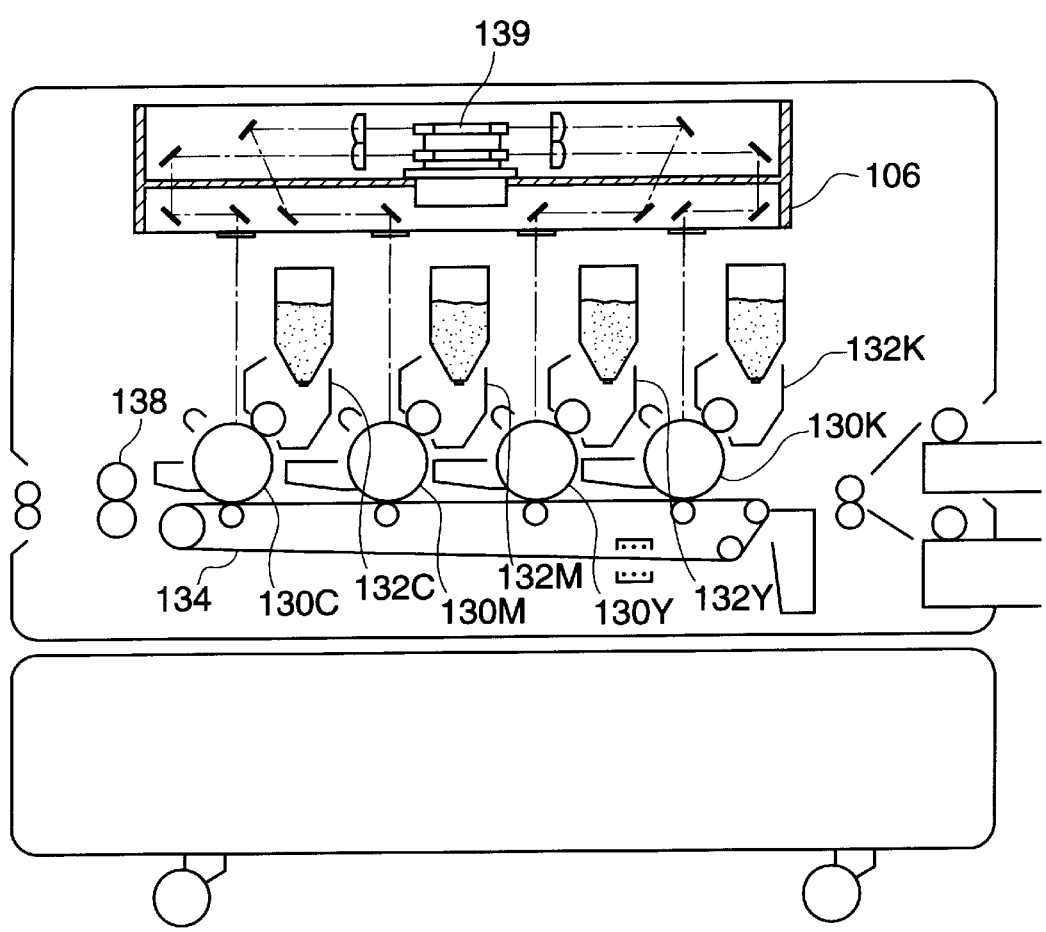
FIG. 32 is a schematic drawing showing a conventional type color image formation device.

In the second embodiment, the optical box 62 is made of aluminum, however, FIG. 21 shows an example that an optical box 84 is made of resin.

The optical box 84 is formed by synthetic resin and six gates are provided to a mold not shown to form the optical box 84.

The position R of the gate is arranged symmetrically based upon the optical axis G of an fθ lens group 26 not shown and a line M perpendicular to the optical axis and passing the center P of the turning of a rotary polygon mirror 28 not shown.

Hereby, if the position R of the gate is arranged as described above even if the anisotropy (the coefficient of linear expansion differs between a direction in which resin flows and a direction perpendicular to the above direction) of linear expansion which resin has is large, a mode of deformation and the quantity of deformation of each part in which optical components composing each of the symmetrical optical systems are attached are equal.

Therefore, correction in case a scanning line on a photoconductor 32 not shown is deflected due to the variation of temperature described in the second embodiment is enabled.

As described above, as the optical scanner according to the present invention is composed as described above, an excellent effect is produced that it is attached to the image formation device and the optical path can be prevented from being deflected due to the deformation of the optical box caused by the variation of temperature in the device.

What is claimed is:

1. An optical scanner used for an image formation device having an image carrier on which a light beam is irradiated and provided with an optical box fixed to the frame of the image formation device, comprising:

a light source that emits a light beam;

a deflector that deflects the light beam;

a lens system that performs scanning on the image carrier and forming an image thereon with the light beam deflected by the deflector; and an optical box that holds the light source, the deflector and the lens system, the optical box being provided with a polygonal bottom, walls stood on each side of the bottom and three or more fixed parts fixed to the frame, wherein the fixed parts are provided in parts apart from the vertex of the outside shape of the bottom on the side of the bottom, and only one fixed part is provided on one side.

2. The optical scanner according to claim 1, wherein the optical box has an opening at a portion facing the bottom and a cover member for covering the opening, and a point at which the cover member is fixed to the optical box is provided in the vicinity of the vertex of each side of the outside shape on the side of the opening of the optical box.

3. An optical scanner used for an image formation device provided with plural image carriers on which a light beam is irradiated, comprising:

an optical box fixed to the frame of the image formation device;

a light source housed in the optical box for emitting a light beam;

a deflector provided with a single rotary polygon mirror for deflecting the light beam; and a horizontal scanning lens for scanning the image carriers with the light beam deflected by the deflector in a horizontal scanning direction, wherein the image carriers are scanned with the reflected light beam via the horizontal scanning lens arranged on both sides of the rotary polygon mirror by making plural light beams incident on each of different symmetrical surfaces of the rotary polygon mirror and reflecting the light beam incident on one surface and the light beam incident on the other surface in reverse directions, and wherein the optical box is provided with a polygonal bottom for holding at least the rotary polygon mirror and the horizontal scanning lens and walls stood on each side of the bottom and is provided with at least four fixed parts fixed to the frame, the fixed parts are provided in parts apart from the vertex of the outside shape of the bottom on the side of the bottom, only one fixed part is provided on the one side, and the plural fixed parts are provided substantially in a position of point symmetry based upon the center of the turning of the rotary polygon mirror, at least one line connecting symmetrical two fixed parts based upon the center of the turning out of at least four or more fixed parts is substantially parallel to the optical axis of the horizontal scanning lens and at least one line connecting the other residual two fixed parts is substantially parallel to a horizontal scanning direction.

4. The optical scanner according to claim 3, further comprising:

plural light receiving elements provided corresponding to each of the plural light beams for detecting the light beam; and a single reflector for respectively guiding the plural light beams to the plural light receiving elements, wherein the reflector is fixed in the vicinity of the fixed part.

5. The optical scanner according to claim 4, further comprising:

a control unit connected to the light receiving element and the light source, wherein the light receiving element detects a light beam reflected on one of different symmetrical surfaces of the rotary polygon mirror and also detects the position in a horizontal scanning direction of the incident light beam and the position in the vertical scanning direction of the incident light beam, and wherein the control unit corrects the light beam emitting timing of a light source for emitting a light beam reflected on one surface of the rotary polygon mirror based upon the detection information of the position in the vertical scanning direction of the light beam from the light receiving element which can detect the position in the horizontal scanning direction of a light beam and the position in the vertical scanning direction of the light beam, and corrects the light beam emitting timing of a light source for emitting a light beam reflected on the other surface of the rotary polygon mirror.

6. The optical scanner according to claim 4, wherein the optical box is formed using a mold provided with plural gates for injecting the material of the optical box where the plural gates are arranged substantially symmetrically based upon the optical axis of the horizontal scanning lens and a line perpendicular to the optical axis of the horizontal scanning lens and passing the center of the turning of the rotary polygon mirror.

7. The optical scanner according to claim 3, wherein the optical box has an opening at a portion facing the bottom and a cover member for covering the opening, and a point at which the cover member is fixed to the optical box is provided in the vicinity of the vertex of each side of the outside shape on the side of the opening of the optical box.

* * * * *